(12) United States Patent
Shafer et al.

(10) Patent No.: US 12,439,017 B2
(45) Date of Patent: *Oct. 7, 2025

(54) METHOD AND SYSTEM FOR ENHANCED IMAGE SENSOR TIMING

(71) Applicant: Intuitive Surgical Operations, Inc., Sunnyvale, CA (US)

(72) Inventors: David C. Shafer, Menlo Park, CA (US); Jeffrey M. DiCarlo, Austin, TX (US); Ian E. McDowall, Woodside, CA (US); Max J. Trejo, San Jose, CA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 261 days.

This patent is subject to a terminal disclaimer.

(21) Appl. No.: 18/135,455

(22) Filed: Apr. 17, 2023

(65) Prior Publication Data

US 2023/0254469 A1  Aug. 10, 2023

Related U.S. Application Data

(63) Continuation of application No. 17/276,061, filed as application No. PCT/US2019/051593 on Sep. 17, 2019, now Pat. No. 11,671,581.

(Continued)

(51) Int. Cl.
  *H04N 13/296* (2018.01)
  *H04N 13/239* (2018.01)
  (Continued)

(52) U.S. Cl.
  CPC ......... *H04N 13/296* (2018.05); *H04N 13/239* (2018.05); *H04N 13/257* (2018.05);
  (Continued)

(58) Field of Classification Search
  CPC .................... H04N 13/296; H04N 13/257
  (Continued)

(56) References Cited

U.S. PATENT DOCUMENTS

| | | |
|---|---|---|
| 11,671,581 B2 | 6/2023 | Shafer et al. |
| 2008/0211941 A1 | 9/2008 | Deever et al. |

(Continued)

FOREIGN PATENT DOCUMENTS

| | | |
|---|---|---|
| JP | 2009296400 A | 12/2009 |
| JP | 2010162123 A | 7/2010 |

(Continued)

OTHER PUBLICATIONS

International Preliminary Report on Patentability for Application No. PCT/US2019/051593, mailed on Apr. 1, 2021, 10 pages.

(Continued)

*Primary Examiner* — Amir Shahnami

(57) ABSTRACT

An image capture device may include an image sensor comprising a first pixel cell and a second pixel cell adjacent to the first pixel cell, a plurality of individual alternative light filters configured to filter non-visible light, one individual alternative light filter of the plurality of individual alternative light filters covering both a first set of pixels of the first pixel cell and a second set of pixels of the second pixel cell, and a plurality of individual visible light color filters covering pixels of the first and second pixel cells, the pixels of the first and second pixel cells covered by the individual visible light color filters being different from the first and second sets of pixels covered by the individual alternative light filters.

19 Claims, 15 Drawing Sheets

Related U.S. Application Data

(60) Provisional application No. 62/732,718, filed on Sep. 18, 2018.

(51) Int. Cl.
*H04N 13/257* (2018.01)
*H04N 23/11* (2023.01)
*H04N 23/13* (2023.01)
*H04N 23/73* (2023.01)
*H04N 23/84* (2023.01)
*H04N 25/13* (2023.01)
*H04N 25/76* (2023.01)

(52) U.S. Cl.
CPC ............ *H04N 23/11* (2023.01); *H04N 23/13* (2023.01); *H04N 23/73* (2023.01); *H04N 23/84* (2023.01); *H04N 25/135* (2023.01); *H04N 25/7795* (2023.01)

(58) Field of Classification Search
USPC .......................................................... 348/47
See application file for complete search history.

(56) References Cited

U.S. PATENT DOCUMENTS

| | | |
|---|---|---|
| 2011/0273599 A1 | 11/2011 | Murata |
| 2014/0152773 A1 | 6/2014 | Ohba et al. |
| 2014/0198184 A1 | 7/2014 | Stein et al. |
| 2016/0182791 A1 | 6/2016 | Lewkow et al. |
| 2017/0026622 A1 | 1/2017 | Yoon et al. |
| 2017/0069098 A1 | 3/2017 | Johannesson |
| 2018/0188427 A1* | 7/2018 | Brueckner ........... H04N 23/843 |
| 2019/0327394 A1 | 10/2019 | Ramirez Luna et al. |
| 2021/0360221 A1 | 11/2021 | Shafer et al. |

FOREIGN PATENT DOCUMENTS

| | | |
|---|---|---|
| JP | 2011523538 A | 8/2011 |
| JP | 2012244312 A | 12/2012 |
| JP | 2012253531 A | 12/2012 |
| JP | 2013121173 A | 6/2013 |
| JP | 2014238731 A | 12/2014 |
| JP | 2016143915 A | 8/2016 |
| WO | WO-2015142800 A1 | 9/2015 |

OTHER PUBLICATIONS

International Search Report and Written Opinion for Application No. PCT/US2019/051593. mailed on Jan. 9, 2020, 14 pages.
Invitation to Pay Additional Fees and PartialInternational Search Report for PCT/US2019/051593, mailed Nov. 8, 2019, 13pages (ISRG07700/PCT).
Vertut, J, and Coiffet, P., "Robot Technology: Teleoperation and Robotics Evolution and Development," English translation, Prentice-Hall, Inc., Inglewood Cliffs, NJ, USA 1986, vol. 3A, 332 pages.

* cited by examiner

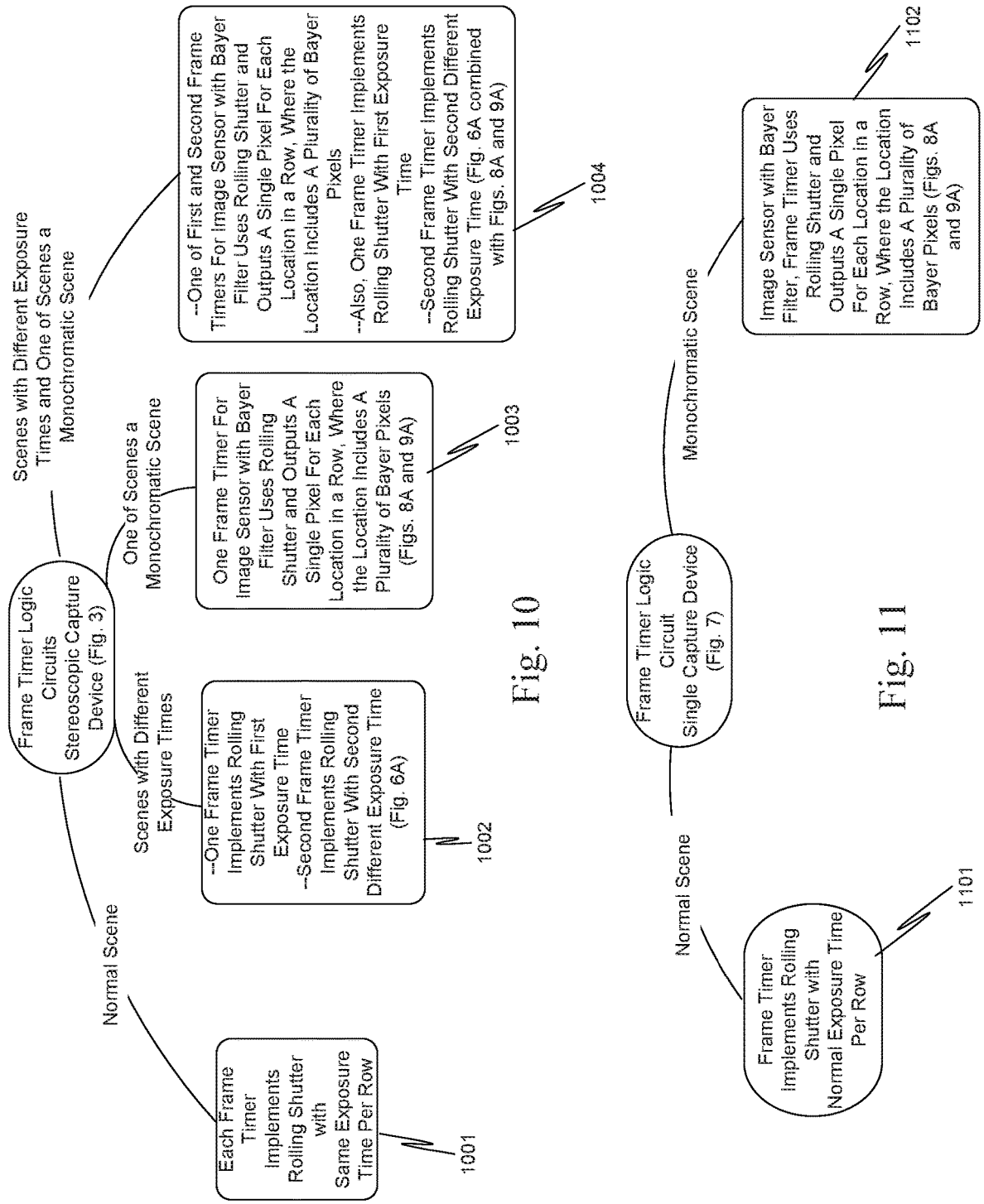

METHOD AND SYSTEM FOR ENHANCED IMAGE SENSOR TIMING

RELATED APPLICATIONS

The present application is a continuation application of U.S. patent application Ser. No. 17/276,061, filed Mar. 12, 2021, which is a U.S. National Stage Application under 35 U.S.C. § 371 of International Application No. PCT/US2019/051593, filed on Sep. 17, 2019, which claims priority to U.S. Provisional Patent Application No. 62/732,718, filed on Sep. 18, 2018, each of which is hereby incorporated by reference in its entirety.

BACKGROUND

Field of Invention

Aspects of this invention are related to medical device imaging, and more particularly to combinations of normal imaging and advanced imaging.

Related Art

Image capture devices are used in minimally invasive surgery. Various imaging modalities—visible scenes, fluorescence scenes, infrared scenes, hyperspectral scenes—are implemented using image capture devices. However, each imaging modality utilizes one or more parameters, e.g., exposure time, that are different from the corresponding one or more parameters in the other imaging modalities. This makes using an image sensor configured for one imaging modality difficult to use for a different imaging modality.

The problem of using a single image sensor for different imaging modalities is further complicated when a stereoscopic image capture system is used and the image sensors have been optimized to capture visible color scenes. As is known, an image sensor includes pixels that capture and integrate light over time. To maximize the area of the chip available for pixels, other circuitry on the image sensor is kept to a minimum.

For example in a stereoscopic complementary metal-oxide-semiconductor (CMOS) sensor integrated circuit, the sensor region is divided into two areas, a first area includes pixels that capture a left scene and a second area includes pixels that capture a right scene. Both areas of the sensor region have the pixels arranged in rows and columns. There is a reset line and a row select line associated with each row of the sensor region, and a read line associated with each pixel of each row of the sensor region. To minimize the logic required on the integrated circuit, a common frame timer logic circuit is used to drive the reset and row select lines of both sensor regions.

FIG. 1 is a timing diagram for a CMOS sensor integrated circuit that utilizes a rolling shutter to capture a frame of pixel data. The timing diagram is the same for both channels of a stereoscopic image capture device. In FIG. 1, an Nth frame 101 is captured, followed by an N+1 frame 102, and by an N+2 frame 103. N+1 frame 102 is sometimes referred to as frame 102.

In this example, the capture of line zero of N+1 frame 102 is considered. (A line of pixels and a row of pixels are the same thing.) The capture of each line of pixels in frame 102 is the same the capture of line zero. Similarly, each frame is captured in the same manner as frame 102. All the lines are not captured at the same time, e.g., the image capture device does not have a mechanical shutter that stops light from reaching a pixel after a predetermined time. Rather, each row of pixels is sequentially read out. This is indicated by diagonal line 102_S for frame 102. The round dot at the right end of each horizontal line indicates that the row select line goes active so that the value of each pixel in the row can be read out on the read line for that row.

To allow the pixel to again accumulate charge over a known time interval, the signal on the reset line for each pixel in row zero goes active and sets each pixel to a known state.

Following the active reset signal, a pixel accumulates charge corresponding to the light incident on the pixel until a signal on the row zero select line goes active, and then the charge stored in the pixel is available on the read line associated with the row. Each row in the frame is read in the same way. When all the rows have been read, a blank row is read to allow for defining the frame. The blank row assures that the loads on the power supply remain constant, and so reduces noise in the captured frames.

SUMMARY

Video viewing capability of a device is enhanced by incorporating an enhanced frame timer in the device to increase the sensitivity of both visible scenes and alternate modality scenes. For example, a stereoscopic image capture device includes a first image sensor, a second image sensor, a first frame timer, and a second frame timer. The first and second frame timers are different frame timers. The first image sensor includes a first plurality of rows of pixels. The second image sensor includes a second plurality of rows of pixels. The first and second image sensors can be separate devices or different areas of a sensor region in an integrated circuit. The first frame timer is coupled to the first image sensor to provide image capture timing signals to the first image sensor. The second frame timer is coupled to the second image sensor to provide image capture timing signals to the second image sensor.

The dual frame timers provide many advantages. For example, one frame timer can be configured to provide signals to one of the image sensors so that the image sensor captures frames at a normal video rate. The other frame timer can be configured to provide signals to the other of the image sensors so that the other of the image sensors captures scenes at a rate slower than the normal video rate. This allows the other of the image sensors to integrate the available light over a longer period of time, and so improve the signal to noise ratio. Specifically, in one aspect, the first frame timer is configured to provide image capture timing signals to sequentially capture N frames in the first image sensor. The second frame timer is configured to provide image capture timing signal to capture one frame in second image sensor for every N frames captured in the first image sensor. Thus, each frame captured by the second image sensor integrates the incident light for a longer period of time than does the first image sensor. This can also be accomplished if the first frame timer is configured to expose each row of the first plurality of rows of pixels for a first exposure time and if the second frame timer is configured to expose each row of the second plurality of active of pixels for a second exposure time, where the first exposure time is different from the second exposure time.

An improved signal to noise ratio also can be obtained with multiple pixel binning. In this aspect, the first image sensor of the stereoscopic image capture device includes, for example, a Bayer color filter array over the first plurality of pixel rows. Each location of the first plurality of pixel rows of the first image sensor includes a set of Bayer pixels. The first framer timer circuit is configured to combine each set of Bayer pixels in a row to form a single output pixel.

In one aspect, the multiple pixel binning is used in combination with the longer exposure time for one of the image capture sensors, sometimes called image sensors. For example, the first image sensor of the stereoscopic image capture device includes a Bayer color filter array over the first plurality of pixel rows. Each location of the first plurality of pixel rows of the first image sensor includes a set of Bayer pixels. The first framer timer circuit is configured to combine each set of Bayer pixels in a row to form a single output pixel. The first frame timer also is configured to expose each row of the first plurality of active rows of pixels for a first exposure time. The second frame timer is configured to expose each row of the second plurality of pixel rows for a second exposure time. The first exposure time is different from the second exposure time. This is advantageous, for example, when it desired to superimposed an augmented scene, such as a fluorescence scene, on a monochromatic scene of the surgical site.

In one aspect, the first plurality of rows of pixels includes a plurality of pixel cells. Each of the plurality of pixel cells includes a plurality of pixels. In this aspect, the first image sensor also includes a visible light color filter array including a plurality of different individual visible light color filters and an alternative light filter array including a plurality of individual alternative light filters. One individual alternative light filter of the plurality of individual alternative light filters covers both a first set of pixels of a plurality of pixels in a first pixel cell of the plurality of pixel cells and a second set of pixels of a plurality of pixels in a second pixel cell of the plurality of pixel cells. The first pixel cell is adjacent the second pixel cell. Each of the plurality of the different individual visible light color filters covers a different pixel in the first and second sets of pixels. The pixels covered by individual visible light color filters of the plurality of different individual color filters are different from pixels covered by the individual alternative light filter.

In this aspect, the first frame timer is configured to simultaneously reset pixels in the first and second pixel cells covered by one of the different individual visible light color filter. The frame timer also is configured to simultaneously read a first pixel of the first pixel cell covered by one of the plurality of different individual visible light color filters and a second pixel of the second pixel cells covered by one of the plurality of different individual visible light color filters.

The first frame timer is also configured to simultaneously read a first pixel in a first set of pixels of the plurality of pixels in a first pixel cell of the plurality of pixel cells and a second pixel of a second set of pixels of a plurality of pixels in a second pixel cell of the plurality of pixel cells. In this aspect, the image capture device is configured to bin the first read pixel and the second read pixel.

In another aspect, the first image sensor further includes a plurality of visible light color filtered cells interleaved with a plurality of alternative light filtered pixel cells.

In still another aspect, an image capture device includes an image sensor. The image sensor includes a plurality of rows of pixels and a visible light color filter array. The visible light color filter array includes a plurality of different individual visible light color filters. The plurality of rows of pixels includes a plurality of pixel cells. Each of the plurality of pixel cells includes a plurality of pixels. Each pixel of the plurality of pixels of a pixel cell is covered by a different one of the plurality of different individual visible light color filters. A frame timer is coupled to the image sensor to provide image capture timing signals to the image sensor. The frame timer is configured to combine a plurality of pixels of a pixel cell to form a single output pixel.

In a further aspect, an image capture device includes an image sensor having a plurality of rows of pixels, a visible light color filter array, and an alternative light filter array. The plurality of rows of pixels includes a plurality of pixel cells. Each of the plurality of pixel cells includes a plurality of pixels. The visible light color filter array includes a plurality of different individual visible light color filters. The alternative light filter array includes a plurality of individual alternative light filters. One individual alternative light filter of the plurality of individual alternative light filters covers both a first set of pixels of the plurality of pixels in a first pixel cell of the plurality of pixel cells and a second set of pixels of the plurality of pixels in a second pixel cell of the plurality of pixel cells. The first pixel cell is adjacent the second pixel cell. Each of the plurality of the different individual visible light color filters covers a different pixel in the first and second sets of pixels. The pixels covered by individual visible light color filters of the plurality of individual visible light color filters being different from pixels covered by the individual alternative light filter.

The image capture device also includes a frame timer coupled to the image sensor to provide image capture timing signals to the image sensor. For example, the frame timer is configured to simultaneously reset pixels in the first and second pixel cells covered by one of the plurality of different individual visible light color filters. The frame timer also is configured to simultaneously read a first pixel of the first pixel cell covered by one of the plurality of different individual visible light color filters and a second pixel of the second pixel cells covered by one of the plurality of different individual visible light color filters.

A first method includes exposing each row of a first plurality of rows of pixels of a first image sensor of a stereoscopic image capture device for a first exposure time using signals from a first frame timer. The method also includes exposing each row of a second plurality of rows of pixels of a second image sensor of the stereoscopic image capture device for a second exposure time using signals from a second frame timer, where the first exposure time is different from the second exposure time.

Another method includes outputting a single output pixel from a location in an image sensor including a plurality of Bayer pixels. The outputting is by a frame timer using signals to combine the plurality of Bayer pixels at the location to form the single output pixel.

BRIEF DESCRIPTION OF THE DRAWINGS

FIG. 10 illustrate some of the combinations that can be obtained using the stereoscopic image capture device of FIG. 3 with dual frame timer logic circuits and various timing sequences.

FIG. 11 illustrates various combinations of the frame timer timing sequences that can be implemented using the image capture device of FIG. 7.

Figure 1:
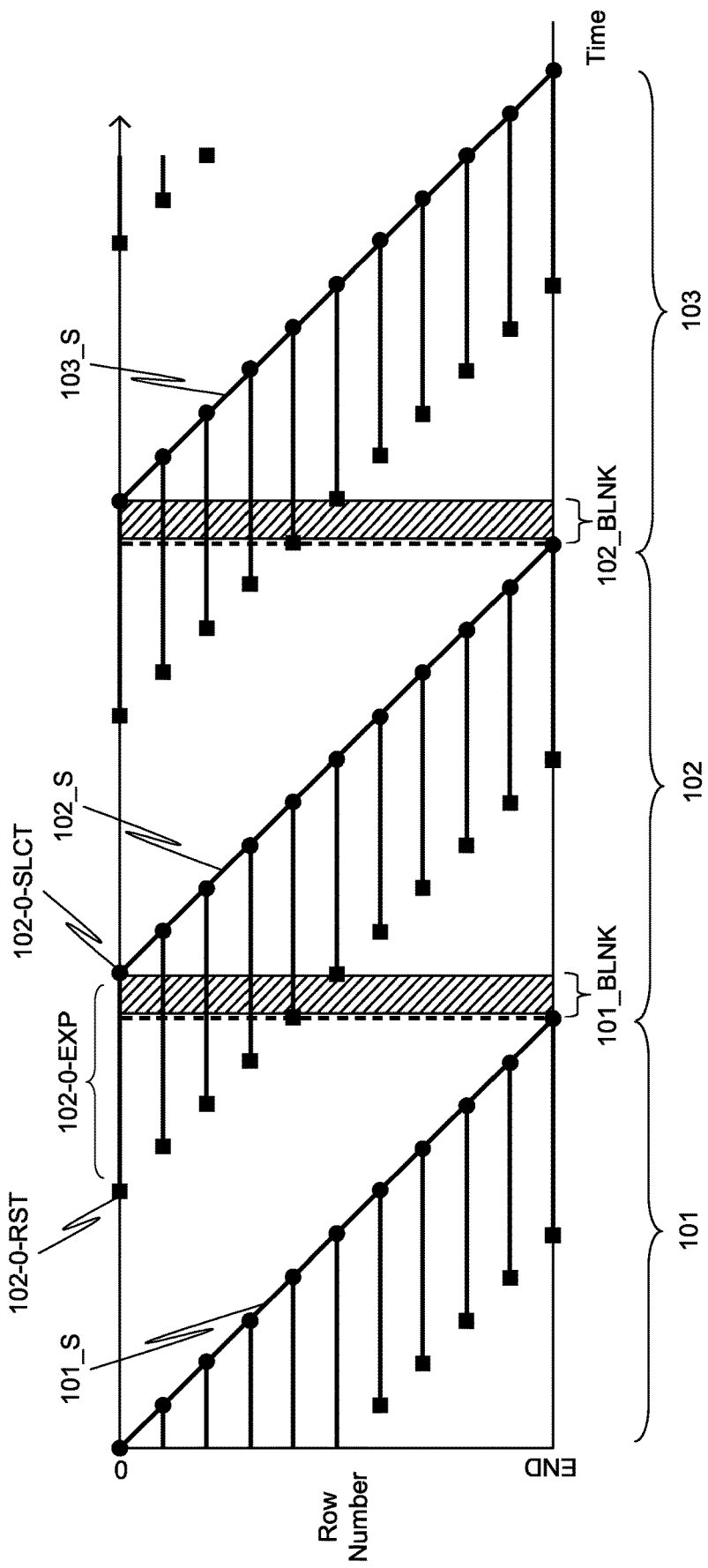
FIG. 1 is a timing diagram for capture of a scene using a rolling shutter.

In the drawings, the first digit of an element's reference number indicates the figure with that single digit figure number in which the element first appeared. The first two digits of an element's reference number indicate the figure with a double digit figure number in which the element first appeared.

DETAILED DESCRIPTION

Aspects of this invention augment video capturing capability and video viewing capability of surgical devices, e.g., computer-assisted surgical systems such as the da Vinci® Surgical System commercialized by Intuitive Surgical, Inc. of Sunnyvale, California, by incorporating an enhanced frame timer to increase the sensitivity of both visible scenes and alternate modality scenes that are used to identify tissue or other aspects of clinical interest during surgery. (da Vinci® is a registered trademark of Intuitive Surgical, Inc. of Sunnyvale, California.) While a computer-assisted surgical system is used herein as an example, aspects of this invention can be used with any device or system that utilizes alternate imaging modalities.

Enhanced frame timer 222 (FIG. 2) utilizes new types of pixel control sequences, which, in one aspect, are implemented in digital logic at low overhead. These control sequences are designed to enhance sensitivity for alternate imaging modes (hyperspectral, fluorescence, high dynamic range, etc.).

A typical Complementary Metal-Oxide-Semiconductor (CMOS) sensor frame timer in an image capture system used a set of state machines to control signals on Reset, Transfer, and Row Select lines in an image sensor pixel array. These state machines typically output a simple sequence of pulses, allowing for shutter width adjustment and things like scene flip. The typical frame time circuits are designed around the particular pixel cell used (e.g., a four-way shared pixel cell), but for conventional imaging uses, access to the low-level timing signals is not allowed. The typical frame timer circuits only allow the user to select values from a limited set of parameters, such as setting a shutter time and row time or frame rate, and altering the timing for specific High Dynamic Range (HDR) modes. The four-way shared pixel cell referenced here, allows many alternate timing sequences, but the conventional frame timer, designed for typical consumer uses, treats these shared pixel cells as a non-shared array and simply scans the pixels by row and by column. In one aspect, enhanced frame timer 222 of image capture system 220 includes enhanced fixed logic that allows more sequences of pulses to be generated on Reset, Transfer and Row Select lines in an image sensor 221 than was possible with prior CMOS sensor frame timers.

In another aspect, enhanced frame timer 222 is implemented with a soft frame timer, where a pulse sequence is downloaded to a memory, e.g., a RAM block, and enhanced frame timer 222 reads the pulse sequence to generate signals on Reset, Transfer and Row Select lines in image sensor 221. This has the advantage that new sequences can be added after the silicon for image sensor 221 including frame timer 222 is released.

Hence, aspects of the invention provide a new flexibility in an enhanced frame timer 222 associated with an image sensor 221. This flexibility allows separation of the exposure for advanced imaging modes (hyperspectral, fluorescence, etc.) from that used in visible-light imaging on image sensor 221. This, in turn, allows different tradeoffs to be made, like a slower frame rate for the advanced imaging data, to improve sensitivity.

Another way enhanced frame timer 222 improves advanced imaging performance is through the on-chip binning of pixels covered by a single filter element. On-chip binning offers noise reduction compared with separate sampling and binning in the digital domain. A typical image sensor bins pixels either for a monochrome sensor or for a Bayer pattern. However, hyperspectral filters available to put on image sensor 221 are larger than typical image sensor pixel sizes. Consequently, with enhanced frame timer 222, the pixel cell is chosen to allow binning tailored to the desired filter pixel size and not just to the pixel size of image sensor 221.

In a stereo image sensor, two active areas on image sensor 221 are usually read out synchronously, which minimizes artifacts in displayed three-dimensional video. However, when a stereo image sensor is used for combined white-light imaging and advanced imaging, enhanced frame timer 222 allows different exposures on the two active areas, while combining the captured pixel data onto a single stream for transmission.

Enhanced frame timer 222 also enables more sensitive advanced imaging by covering different lines of an active area of image sensor 221, or one of the active areas in a stereo image sensor, with a different filter material; for example, one active area is set up for visible imaging, and the other active area with no filters, for fluorescence imaging.

Often, it is desirable to acquire advanced imaging data along with visible-light scenes at the same time. Enhanced frame timer 222 utilizes a method for interlacing different exposure settings per color or per row of the one image sensor with conventional video imaging. The alternate pixel timing sequences used for the advanced imaging modes can also be used for high dynamic range visible light imaging; for example, by exposing green pixels in a typical Bayer pattern differently.

Finally, the same frame timer enhancements used to enable advanced imaging can be applied to the standard Bayer pattern, by using a four-way shared pixel cell to allow a simple means of exposing different colors by different amounts, for improved noise performance in conventional imaging.

Figure 2:
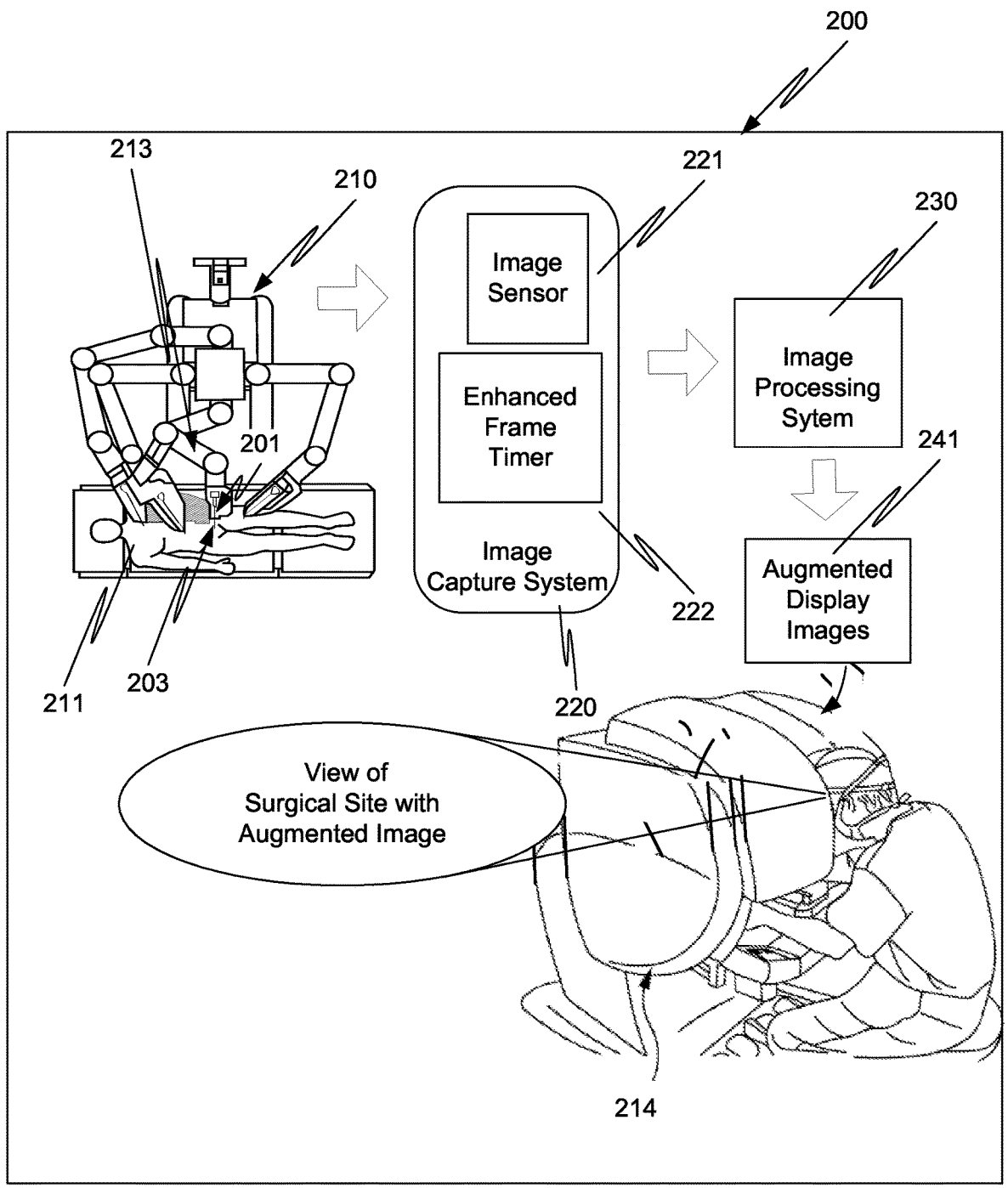
FIG. 2 is a diagram of a computer-assisted surgical system that includes an enhanced frame timer that allows implementation of alternative rolling shutter image capture sequences.

FIG. 2 is a high level diagrammatic view of a computer-assisted surgical system 200, for example, the da Vinci® Surgical System. In this example, a surgeon, using a surgeon's console 214, remotely manipulates an endoscope 201 using a robotic manipulator arm 213. The surgeon can also manipulate surgical instruments mounted on other robotic manipulator arms. There are other parts, cables etc. associated with computer-assisted surgical system 200, but these are not illustrated in FIG. 2 to avoid detracting from the disclosure. Further information regarding computer-assisted surgical systems may be found, for example, in U.S. Patent Application Publication No. US 2008-0065105 A1 (filed Jun. 13, 2007; disclosing Minimally Invasive Surgical System) and U.S. Pat. No. 6,331,181 (filed Dec. 18, 2001; disclosing Surgical Robotic Tools, Data Architecture, and Use), both of which are incorporated herein by reference.

An illumination system (not shown) is coupled to or alternatively included within endoscope 201. In one aspect, the illumination system provides white light illumination or a combination of white light illumination and an alternate imaging mode illumination, e.g., hyperspectral illumination. In one aspect, all or part of this light is coupled to at least one illumination path in endoscope 201. In another aspect, the illumination sources are located at or near the distal tip of endoscope 201. In one aspect, both the visible white light illumination and the alternate imaging mode illumination are constant during the surgical procedure. In another aspect, the visible illumination is constant in time, but the spectrum of the alternate imaging mode illumination changes with time.

In this aspect, light from endoscope 201 illuminates tissue 203 of a patient 211. Endoscope 201, in one aspect, is a stereoscopic endoscope, which includes two optical channels, e.g., a left optical channel and a right optical channel, for passing light from tissue 203 to image sensor 221, which includes two sensing areas—one that captures a left scene and another that captures a right scene. Endoscope 201, in another aspect, is a monoscopic endoscope, which includes a single optical channel for passing light from the tissue to image sensor 221, which in this instance includes a single sensing area.

As explained more completely below, for both types of endoscopes, the reflected white light is captured as a visible light frames by an image capture system 220. Visible light frames include, for example, visible scenes that include scenes of tissue, and visible light frames sometimes are referred to as visible frames. Reflected non-visible light and/or emitted light from tissue are captured as augmented light frames by image capture system 220. Augmented light frames include, for example hyperspectral scenes of tissue 203 or other features in the field of view of endoscope 201, or fluorescence from tissue 203. In another aspect, the augmented light frames include pixels with different exposures, which can be used in producing high dynamic range scenes. Augmented light frames sometimes are referred to as augmented frames.

In one aspect, cameras in image capture system 220 are mounted on a proximal end of endoscope 201. In another aspect, the cameras are mounted in a distal end of endoscope 201. Here, a camera includes at least a frame timer and an image sensor. Here, distal means closer to the surgical site and proximal means further from the surgical site. The cameras capture the visible and augmented frames through the same front end optics, in one aspect. This is contrast to systems that utilize special front end optics to capture for example hyperspectral frames.

Figure 3:
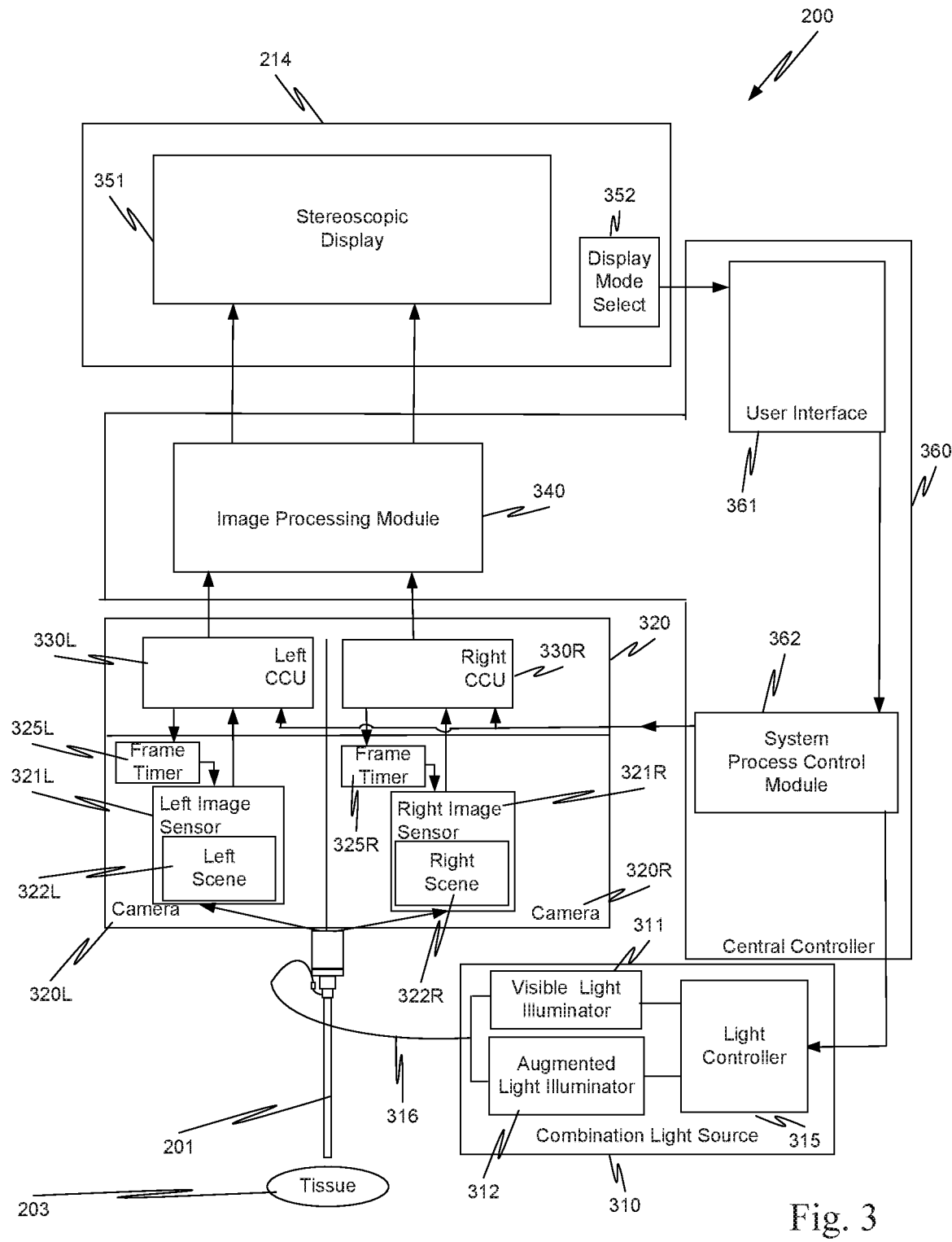
FIG. 3 is a more detailed diagram of part of a computer assisted surgical system that includes a stereoscopic image capture device with each channel of the stereoscopic image capture device having its own frame timer.

FIG. 3 is a more detailed illustration of the aspects of one example of computer-assisted surgical system 200 of FIG. 2. In the embodiment of FIG. 3, computer-assisted surgical system 200 includes an illuminator that is a combination light source 310. Combination light source 310 includes a visible light illuminator 311, e.g., a white light source, and an augmented light illuminator 312. The particular implementation of illuminators 311 and 312 is not critical so long as combination light source 310 has the capabilities described more completely below.

In this aspect, combination light source 310 is used in conjunction with at least one illumination path in stereoscopic endoscope 201 to illuminate tissue 203. In one aspect, combination light source 310 has at least two modes of operation: a normal viewing mode and an augmented viewing mode.

In the normal viewing mode, visible light illuminator 311 provides illumination that illuminates tissue 203 in white light. Augmented light illuminator 312 is not used in the normal viewing mode.

In the augmented viewing mode, visible light illuminator 311 provides illumination that illuminates tissue 203 in white light. In one aspect, augmented light illuminator 312 provides illumination that illuminates tissue 203 with hyperspectral light, e.g., light in the near-infrared spectrum, or alternatively with light that excites fluorescence.

Use of near-infrared light as an example of hyperspectral illumination is illustrative only and is not intended to be limiting to this particular aspect. In view of the disclosure, one knowledgeable in the field can select hyperspectral illumination that makes the non-salient features in the captured visible frames salient in the captured augmented frames.

In one aspect, visible light illuminator 311 includes a source for each of the different visible color illumination components. For a red-green-blue implementation, in one example, the sources are lasers, a red laser, two green lasers and a blue laser. In one aspect, the light from visible light illuminator 311 has its spectrum shaped so that the light appears to have a purple tint to the human eye. See PCT International Publication No. WO 2015/142800 A1, which is incorporated herein by reference.

The use of lasers in visible light illuminator 311 is illustrative only and is not intended to be limiting. Visible light illuminator 311 could also be implemented with multiple light emitting diode (LED) sources instead of lasers for example. Alternatively, visible light illuminator 311 could use a Xenon lamp with an elliptic back reflector and a band pass filter coating to create broadband white illumination light for visible scenes. The use of a Xenon lamp also is illustrative only and is not intended to be limiting. For example, a high pressure mercury arc lamp, other arc lamps, or other broadband light sources may be used.

The implementation of augmented light illuminator 312 depends on the light spectrum of interest. Typically, a laser module, laser modules, a light-emitting diode or light emitting diodes are used as augmented light illuminator 312.

In the normal and the augmented viewing modes, the light from visible light illuminator 311 or light from visible light illuminator 311 and light from augmented light illuminator 312 is directed into a connector 316. Connector 316 provides the light to an illumination path in stereoscopic endoscope 201 that in turn directs the light to tissue 203. Each of connector 316 and the illumination path in stereoscopic endoscope 201 can be implemented, for example, with a fiber optic bundle, a single stiff or flexible rod, or an optical fiber.

Light from surgical site 203 (FIG. 3) is passed by the stereoscopic optical channel in endoscope 201, e.g., a left optical channel and a right optical channel, or alternatively, a first optical channel and a second optical channel, to cameras 320L, 320R. The use of two discrete cameras 320L and 320R is for ease of illustration and discussion, and should not be interpreted as requiring two discrete cameras or two discrete image capture units. The components of cameras 320L and 320R can be combined in a single unit.

As explained more completely below, left camera 320L includes a left image sensor 321L. Left image sensor 321L captures light received from the left channel of stereoscopic endoscope 301 as a left frame 322L. Similarly, right camera 320R includes a right image sensor 321R. Right image sensor 321R captures light received from the right channel of stereoscopic endoscope 301 as a right frame 322R. Left image sensor 321L and right image sensor 321R can be separate sensors or different active areas of a single sensor. Also, the use of left and right is intended to assist in differentiating between the first and second sensors.

Camera 320L includes a first frame timer circuit 325L, sometimes called frame timer 325L, which, in this aspect, is coupled to left camera control unit 330L and to left image sensor 321L. Camera 320R includes a second frame timer circuit 325R, sometimes called frame timer 325R, which, in this aspect, is coupled to right camera control unit 330R and to right image sensor 321R. The use of an individual frame timer for each image sensor provides enhanced imaging capability compared to configurations that used a common frame timer for all the image sensors. The use of separate frame timers 325L, 325R allows separation of the exposure for advanced imaging modes (hyperspectral, fluorescence, etc.) captured by one of the image sensors from that used in visible-light imaging on the other of the image sensors. This, in turn, allows different tradeoffs to be made, like a slower frame rate for the advanced imaging data, to improve sensitivity. Another way the use of separate frame timers improves advanced imaging performance is through on-chip binning of pixels covered by a single filter element. On-chip binning offers noise reduction compared with separate sampling and binning in the digital domain.

Camera 320L is coupled to a stereoscopic display 351 in surgeon's console 214 by a left camera control unit 330L and image processing module 340. Image processing module 340 is a part of image processing system 130. Camera 320R is coupled to stereoscopic display 351 in surgeon's console 214 by a right camera control unit 330R and image processing module 340. Camera control units 330L, 330R receive signals from a system process control module 362. System process control module 362 represents the various controllers in system 300.

Display mode select switch 352 provides a signal to a user interface 361 that in turn passes the selected display mode to system process control module 362. Various controllers within system process control module 362 configure illumination controller 315, configure left and right camera control units 330L and 330R to acquire the desired scenes, and configure any other elements in imaging processing module 340 needed to process the acquired scenes so that the surgeon is presented the requested scenes in stereoscopic display 351. Imaging processing module 340 implements image processing pipelines equivalent to known image processing pipelines.

The video output on stereoscopic display 351 may be toggled between the normal and augmented viewing modes by using, e.g., a foot switch, a double click of the master grips that are used to control the surgical instruments, voice control, and other like switching methods. The toggle for switching between the viewing modes is represented in FIG. 3 as display mode select switch 352.

Central controller 360 and system process control module 362 are similar to prior systems with the exception of the aspects described more completely below. Although described as a central controller 360, it is to be appreciated that central controller 360 may be implemented in practice by any number of modules and each module may include any combination of components. Each module and each component may include hardware, software that is executed on a processor, and firmware, or any combination of the three.

Also, the functions and acts of central controller 360 and system process control module 362, as described herein, may be performed by one module, or divided up among different modules or even among different components of a module. When divided up among different modules or components, the modules or components may be centralized in one location or distributed across system 200 for distributed processing purposes. Thus, central controller 360 and system process control module 362 should not be interpreted as requiring a single physical entity as in some aspects both are distributed across system 200.

Further information regarding computer-assisted surgical systems may be found for example in U.S. patent application Ser. No. 11/762,165 (filed Jun. 23, 2007; disclosing Minimally Invasive Surgical System), U.S. Pat. No. 6,837,883 B2 (filed Oct. 5, 2001; disclosing Arm Cart for Telerobotic Surgical System), and U.S. Pat. No. 6,331,181 (filed Dec. 28, 2001; disclosing Surgical Robotic Tools, Data Architecture, and Use), all of which are incorporated herein by reference.

In FIG. 3, cameras 320L, 320R and combination light source 310 are shown as being external to endoscope 201. However, in one aspect, cameras 320L, 320R and light source 310 are included in the distal tip of endoscope 201, which is adjacent tissue 203. Also, left image sensor 321L and right image sensor 321R can be different active areas of a sensor region of an integrated circuit chip that includes left frame timer circuit 325L and right frame timer circuit 325R.

System controller 320 (FIG. 3) is illustrated as unified structures for ease of illustration and understanding. This is illustrative only and is not intended to be limiting. The various component of system controller 320 can be located apart and still perform the functions described.

Stereoscopic Image Capture with Alternate Frame Timing

In some aspects, a first scene captured by left image sensor 321L is presented in the left eye viewer of stereoscopic display 351 and a second scene captured by right image sensor 321R is presented in the right eye viewer of stereoscopic display 351. For example, a normal color scene of the surgical site is presented to the left eye of the user and an augmented scene of the surgical site is presented to the right eye of the user.

Typically, an augmented scene captured by one of the image sensors has a significantly lower intensity than the intensity of a color scene captured by the other of the image sensors. Previously, the intensity differences were compensated for by digitally processing the captured scenes. Unfortunately, this can introduce noise caused, for example, by amplifying the low signal levels.

Figure 4:
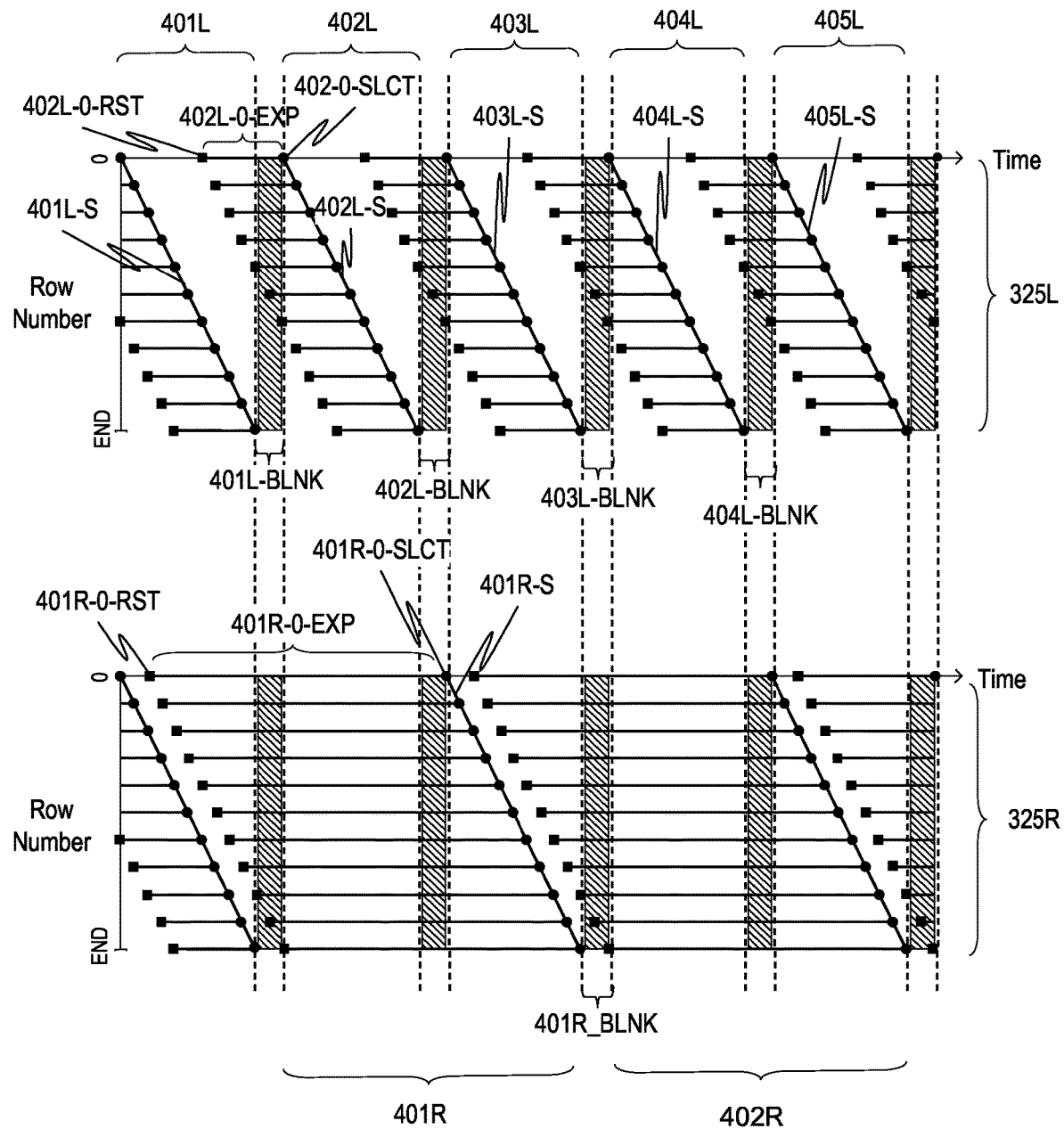
FIG. 4 is a timing diagram for one aspect of capture of scenes with different exposure times using a rolling shutter in the stereoscopic image capture device of FIG. 3.

In this aspect, frame timers 325L and 325R are configured to read out the data from left image sensor 321L and the data from right image sensor 321R at different rates. For example, as illustrated in FIG. 4, a visible color scene, i.e., a reflected white light scene, is captured by left image sensor 321L at the normal rate, e.g., sixty frame per second. An augmented scene, e.g., a fluorescence scene or a hyperspectral scene, is captured by right image sensor 321R at a slower rate than the normal rate, e.g., thirty frame per second. FIG. 4 illustrates the implementation of the rolling shutter by frame timer 325L for left image sensor 321L and the implementation of the rolling shutter by frame timer 325R for right image sensor 321R.

In this example, each of left image sensor 321L and right image sensor 321R is assumed to have (m+2) rows of pixels–(m+1) active rows and a dummy row. Thus, the active rows are numbered from 0 to m.

Frame timer 325L repetitively provides signals on the transmit, reset and select lines to image sensor 321L captures each of frames 401L, 402L, 403L, 404L, and 405L in the same way with same timing. In this example, the capture of frame 402L and in particular, row zero of frame 402L is considered. The capture of each row of pixels in frame 402L is the same as row zero.

As previously pointed out, with a rolling shutter, all the active rows of image sensor 321L are not captured at the same time, e.g., camera 320L does not have a mechanical shutter that stops light from reaching a pixel after a predetermined time. Rather, each row of pixels is sequentially read out. This is indicated by diagonal line 402L-S for frame 402L. Line 402L-S represents the rolling shutter for capture of frame 402L by image sensor 321L. Each of frames 401L, 403L, 404L, and 405L has an equivalent rolling shutter 401L-S, 403L-S, 404L-S, and 405L-S, respectively.

To allow each pixel in a row to again accumulate charge, a signal on the reset line for the row goes active. The square at the left end of each horizontal line in FIG. 4 represents the signal on the reset line for that row going active. Thus, square 402L-0-RST represents the reset signal for row zero in frame 402L going active so that each pixel in row zero is set to a known state and begins accumulating charge that corresponds to the light incident on that pixel.

The round dot at the right end of each horizontal line in FIG. 4 indicates that the signal on the row select line for that row goes active so that the value of each pixel in the row is read out. When each pixel in the row is read out, the shutter for that row is effectively closed. Thus, dot 402L-0-SLCT represents the row select signal for row zero in frame 402L going active so that the value of each pixel in row zero is read out.

Time 402L-0-EXP between when the time when pixels in row zero in frame 402L are set to a known state and the time when the row select line for row zero goes active and the pixel values in row zero are read out is the exposure time for that row. Thus, frame timer 325L can control the exposure time for a row in a frame by controlling the time interval between when the row select signal for the row in the previous frame goes active and when the reset signal for the row in the current frame goes active.

When all the active rows in frame have been read, a dummy row of image sensor 321L is read. The time interval used in reading the dummy row is time interval 401L-BLNK for frame 401L, time interval 402L-BLNK for frame 402L, time interval 403L-BLNK for frame 403L, time interval 404L-BLNK for frame 404L, and time interval 405L-BLNK for frame 405L. Blanking is a typical feature of video timing, but while blanking is useful in processing and display, it is not necessary to have any blanking or dummy row readout to use any of the pixel timing sequences described herein.

The operation of frame timer 325R with respect to resetting a row of pixels and reading out a row of pixels is equivalent to that just described for frame timer 325L, but the various signals are activated a slower rate. Frame 401R is captured in the same time interval that frames 402L and 403L are captured, while frame 402R is captured in the same time interval that frames 404L and 405L are captured.

Line 401R-S represents the rolling shutter for frame 401R. Square 402R-0-RST represents the reset signal for row zero in frame 401R going active so that each pixel in row zero is set to a known state and begins accumulating charge that corresponds to the light incident on that pixel. Dot 402R-0-SLCT represents the row select signal for row zero in frame 401R going active so that the value of each pixel in row zero is read out. Time 401R-0-EXP between when the time when pixels in row zero in frame 401R are set to a known state and the time when the row select line for row zero goes active and the pixel values in row zero are read out is the exposure time for that row.

When all the active rows in frame 401R have been read, a dummy row of image sensor 321L is read. The time interval used in reading the dummy row is time interval 401R-BLNK for frame 401R.

Thus, FIG. 4 illustrates that while the frames in left image sensor 321L are read out at the normal rate, the frames in right image sensor 321R are read out at half the rate. This allows right image sensor 321R to integrate in the incident light over a longer time period, which in turn improves the signal to noise ratio compared to capturing the frames in right image sensor 321R at the normal rate and then digitally amplifying the captured signals.

Figure 5:
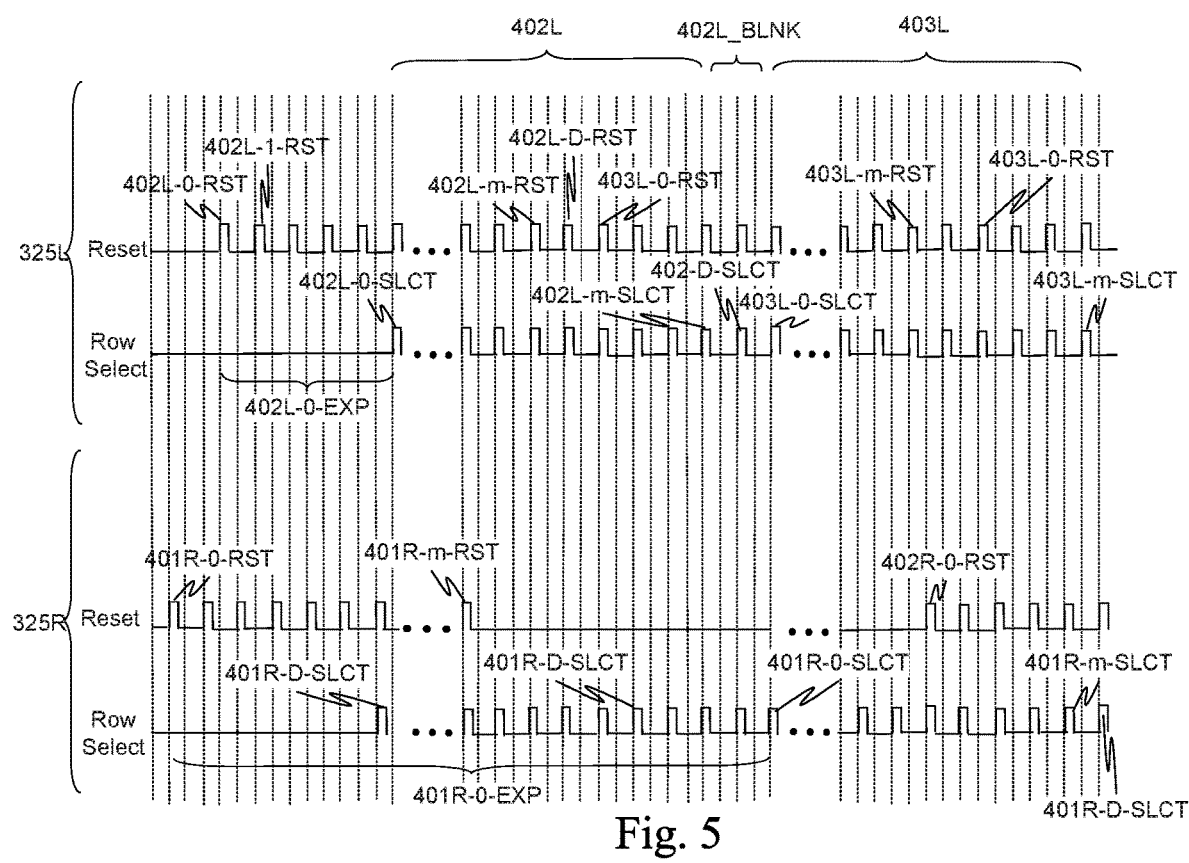
FIG. 5 is a more detailed timing diagram for one aspect of capture of scenes with different exposure times using a rolling shutter in the stereoscopic image capture device of FIG. 3.

FIG. 5 is a more detailed timing diagram of the reset and select signals generated by frame timers 325L and 325R. Note that the timing diagram is for the frames of interest in demonstrating the different exposure times for the two image sensors. FIG. 5 does not include all signals for the frames in FIG. 4.

The references numerals of the pulses in FIG. 5 are the same as the corresponding reference numerals in FIG. 4. However, there are some additional reference numerals in FIG. 5. The key to the reference numerals in FIGS. 4 and 5 is:

xxxy-s-name, where
- xxx is the reference number of the frame in FIG. 4;
- y represents that channel, Right or Left, in this example;
- s is the row number, 0 to m for active rows, and D for the dummy row; and
- name, RST=row reset, SLCT=row select, EXP=exposure time.

Frame timer 325L generates active row reset signals 401L-0-RST to 401L-m-RST sequentially in time for each of rows zero to m of image sensor 321L. Following the exposure time for each of the rows, frame timer 325L generate active row select signals 401L-0-SLCT to 401L-m-SLCT sequentially in time for each of rows zero to m of image sensor 321L.

After each of the active rows is reset, frame timer 325L generates an active dummy row reset signal 401L-D-RST for the dummy row of image sensor 321L, and after the exposure time, frame timer 325L generates an active row select signal 401L-D-SLCT for the dummy row of image sensor 321L. After generating the dummy row signals, frame timer 325L continues generating the row reset and row select signals for each of the subsequent frames captured by image sensor 321L.

The operation of frame timer 325R is different from that of frame timer 325L. Frame timer 325L generates active row reset signals 401R-0-RST to 401L-m-RST sequentially in time for each of rows zero to m of image sensor 321R, but then frame timer 325R either stops generating active row reset signals, or generates active reset signals for the dummy row, until it is time to initiate capture of the next frame.

After capture of a preceding frame in image sensor 321R is complete, frame timer 325R generates dummy row select signals 401R-D-SLCT until exposure time 401R-0-EXP for the zeroth row in image sensor 321R has elapsed, and then frame timer 325R generates active row select signals 401R-0-SLCT to 401L-m-SLCT sequentially in time for each of rows zero to m of image sensor 321R.

In this example, the exposure time for a frame captured by image sensor 321R is twice as long as the exposure time for a frame captured by image sensor 321L. However, this approach of using the two image sensors to capture scenes with different exposures can be generalized as illustrated in FIG. 6.

Figure 6:
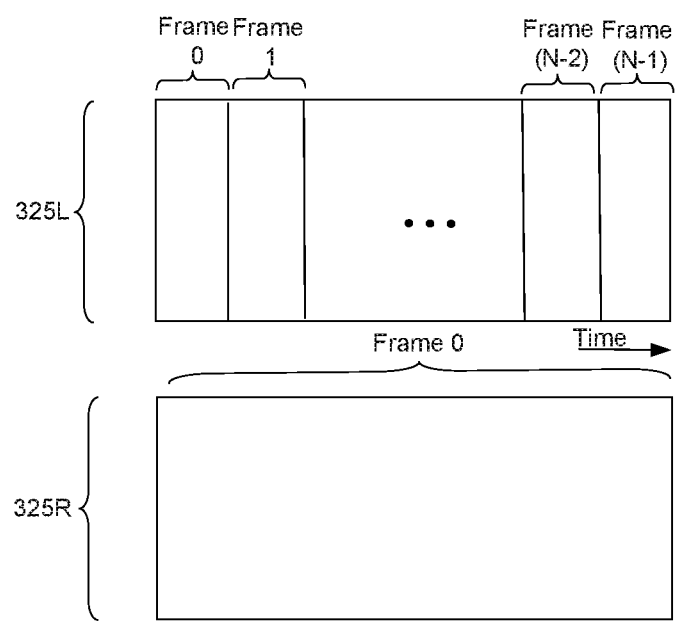
FIG. 6 is a generalized diagram showing that in one channel of the stereoscopic image capture device of FIG. 3 N frames are captured while only a single frame is captured in the other channel of the stereoscopic image capture device of FIG. 3.

In FIG. 6, frame timer 325L is configured to time sequentially capture N frames—frame 0 to frame (N−1)—in image sensor 321L while frame timer 325R captures one frame—frame 0—in image sensor 321R. Here, N is a positive number greater than zero, in one aspect. Thus, the exposure time of a frame captured in image sensor 321R is N times the exposure time of a frame captured in image sensor. FIG. 5 is the case where N is two.

Pixel Binning

Figure 7:
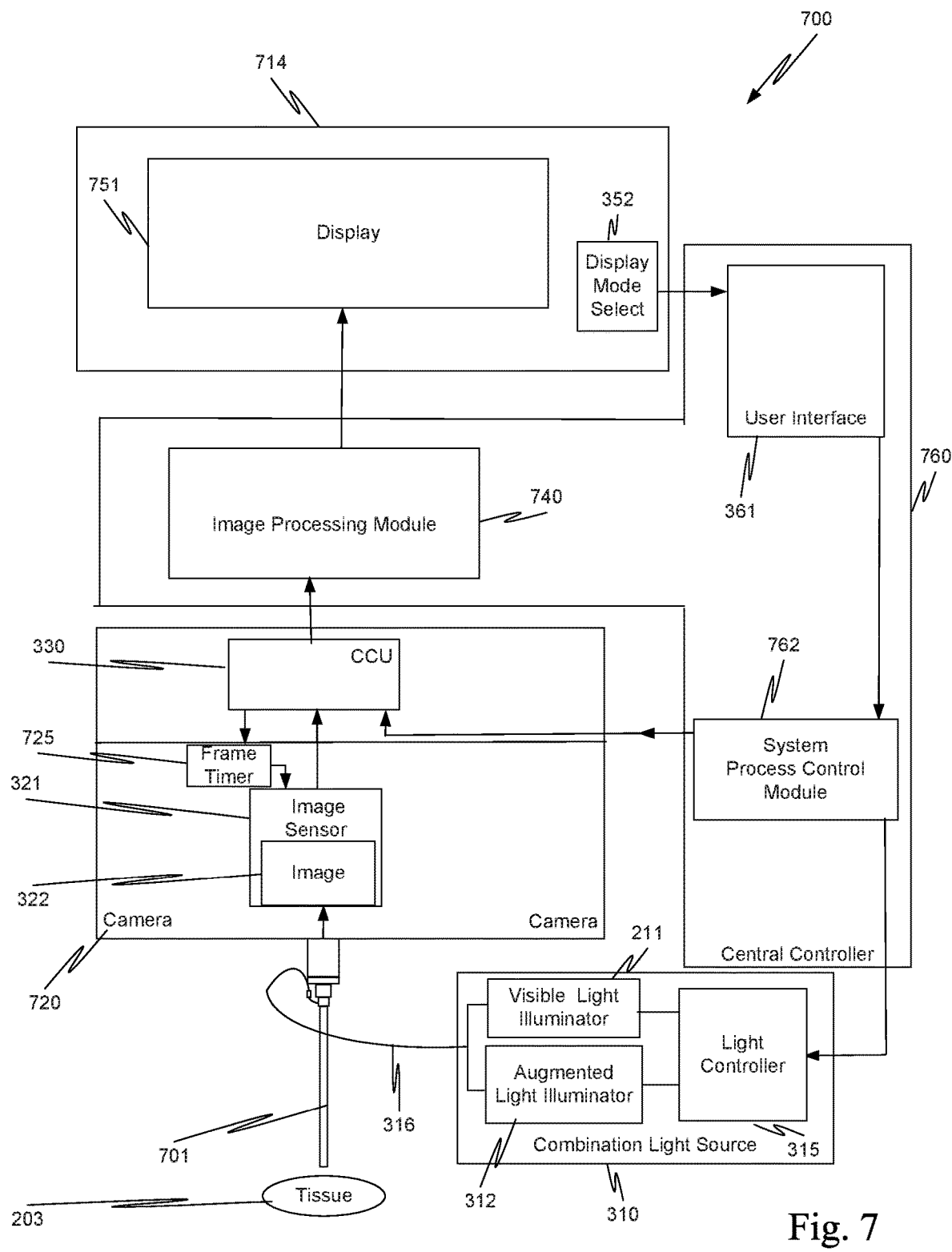
FIG. 7 is a more detailed diagram of part of a computer assisted surgical system that includes an image capture device with a single image sensor and a single frame timer.

The pixel binning aspects described more completely below can be implemented in stereoscopic computer-assisted surgical system 200 of FIG. 3 or in monoscopic system 700 of FIG. 7. In FIG. 7, image sensor 321, image 322, and camera control unit 330 are equivalent to image sensors 321R, 321L, frames 322R, 322L, and camera control units 330R, 330L, and so the description of those elements is not repeated here. Similarly, image processing module 740, surgeon's console 714 with display 751, central controller 760 and system process control module 762 are equivalent to the corresponding element in FIG. 3 for either the left or the right channels of FIG. 3. Endoscope 701 is similar to endoscope 301, except endoscope 701 has only a single optical channel that transmits light from tissue 203 to camera 720. Thus, monoscopic system 700 is equivalent to the system of FIG. 3 with one of the left and right channels of FIG. 3 removed, and so is not described in further detail because the description is repetitious of the description of the elements in FIG. 3.

Multiple Pixel Binning with a Bayer Color Filter Array

Figure 8A:
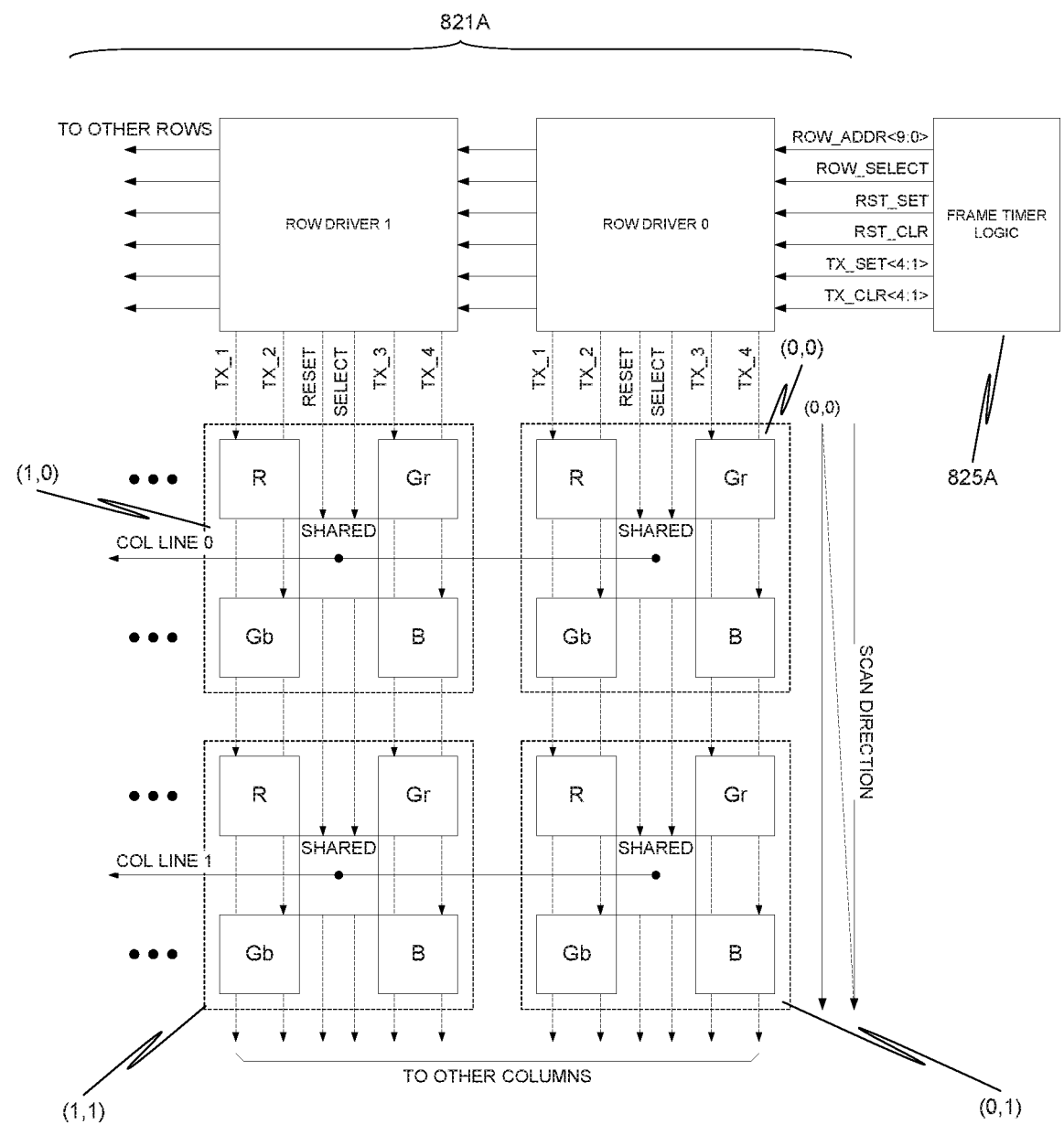
FIG. 8A is diagram of a frame timer and a portion of a pixel array of an image sensor with a Bayer color filter array that includes a set of Bayer pixels, sometime referred to as a plurality of Bayer pixels, at each location in the pixel array.

FIG. 8A is an illustration of a representative portion of a Bayer color filter on a CMOS image sensor with a four-way shared pixel cell and a novel frame timer 825A. Thus, FIG. 8A is an example of a part of an image capture unit having an image sensor 821A with a Bayer color filter array and a frame timer 825A. Image sensor 821A and frame timer 825A are examples of image sensor 321L and frame timer 325L, image sensor 321R and frame timer 325R, or image sensor 321 and frame trimer 325.

Each location in an image sensor includes a plurality of pixels. In FIG. 8, only four locations (0,0), (0,1), (1,0), and (1,1) are shown, where each location includes four pixels connected to a shared column line, which is a four-way shared pixel cell. The other locations in image sensor 821A, which are not shown, are arranged in a corresponding manner.

In this example, each pixel is covered by a filter in the Bayer color filter array. As is known, in a Bayer color filter array, fifty percent of the filters are green filters, twenty-five percent are red filters R, and twenty-five percent are blue filters B. In this example, the green filters are divided into first green filters Gr and second green filters Gb, for ease of discussion. The two green filters use the same filter dye and pass the same wavelength range, in this example. There is a one-to-one correspondence between filters in the Bayer color filter array and the pixels in image sensor 821A, meaning that each pixel in image sensor 821A is covered by a different filter in the Bayer color filter array, in this aspect. While a Bayer color filter array is used as an example, it is not necessary that the color filter arrays have this specific configuration. Color filter arrays with different colors or with different proportions of the various colors can also be used in the applications described herein.

A pixel covered by a red filter R is referred to as a red pixel R. A pixel covered by a first green filter Gr, is referred to a first green pixel Gr. A pixel covered by a second green filter Gb, is referred to a second green pixel Gb. A pixel covered by a blue filter B is referred to as a blue pixel B. Thus, in FIG. 8A, each location includes a red pixel, first and second green pixels, and a blue pixel. Also, in FIGS. 8A and 8B, the rows are illustrated as extending in the vertical direction and the columns as extending in the horizontal direction. This is for ease of illustration and should not be construed as limiting the rows and columns of the image sensor to any particular orientation. The configurations described more completely below operate the same independent of the orientation of the rows and of the columns.

Each row driver of image sensor 821A is connected to a different plurality of pixel rows. A first transmit line Tx_1 connects the row driver to each red pixel in a second row connected to the row driver. A second transmit line Tx-2 connects the row driver to each second green pixel in a second row connected to the row driver. A third transmit line Tx_3 connects the row driver to each first green pixel in a first row connected to the row driver. A fourth transmit line Tx_4 connects the row driver to each blue pixel in the first row connected to the row driver.

A reset line RESET connects the row driver to a shared column driver SHARED at each location in the two rows associated with the row driver. A select line SELECT connects the row driver to shared column driver SHARED at each location in the two rows associated with the row driver. In one aspect, each shared column driver SHARED is a single floating diffusion charge storage node.

Frame timer 825A is connected to each of the row drivers of image sensor 821A by a plurality of lines. In this example, the plurality of lines includes twenty-one lines.

Ten lines of the twenty-one lines are row address lines ROW_ADDR<9,0>. Row address lines ROW_ADDR<9,0> carry an address of the row being accessed by frame timer 825A.

Three of the twenty-one lines are a row select line ROW_SELECT, a reset set line RST_SET, and a reset clear line RST_CLR. An active signal on row select line ROW_SELECT causes the row driver addressed by the address on row address lines ROW_ADDR<9,0> to drive an active signal on select line SELECT. An active signal on reset set line RST_SET causes the row driver addressed by the address on row address lines ROW_ADDR<9,0> to drive an active signal on reset line RESET.

An active signal on reset clear line RST_CLR causes the row driver addressed by the address on row address lines ROW_ADDR<9,0> to drive an inactive signal on reset line RESET.

Four of the twenty one lines are transmit set lines TX_SET<4,1> and another four of the twenty-one lines are transmit clear lines TX_CLR<4,1>. Each one of transmit set lines TX_SET<4,1> is coupled through the row driver to a different one of first transmit line Tx_1, second transmit line Tx-2, third transmit line Tx_3, and fourth transmit line Tx_4—for example, transmit set line TX_SET(1) is coupled to first transmit line Tx_1, transmit set line TX_SET(2) is coupled to second transmit line Tx_2, etc. Similarly, each one of transmit set lines TX_CLR<4,1> is coupled through the row driver to a different one of first transmit line Tx_1, second transmit line Tx-2, third transmit line Tx_3, and fourth transmit line Tx_4—for example, transmit clear line TX_CLR(1) is coupled to first transmit line Tx_1, transmit clear line TX_CLR(2) is coupled to second transmit line Tx_2, etc.

An active signal on transmit set line TX_SET(1) causes the row driver addressed by the address on row address lines ROW_ADDR<9,0> to drive an active signal on first transmit line Tx_1, and so on for the other transmit set lines. An active signal on transmit clear line TX_CLR(1) causes the row driver addressed by the address on row address lines ROW_ADDR<9,0> to drive an inactive signal on first transmit line Tx_1, and so on for the other transmit lines.

With reset set line RST_SET, a reset clear line RST_CLR, transmit set lines TX_SET<4,1>, and transmit clear lines TX_CLR<4,1>, pulses can be sent to different rows during a single row time, and the length of those pulses can be longer than the time between them. When transmit set line TX_SET1 goes active, the particular first transmit line Tx_1 line with the matching row address goes active and stays high until the same first transmit line Tx_1 is again addressed and transmit clear line TX_CLR1 goes active. Lines TX_SETx and TX_CLRx, and RST_SET and RST_CLR are driven with short pulses that control the timing of the edges of a longer pulse on line Tx_1, etc. Thus, with these lines, pulses can be sent to different rows during a single row time, and the length of those pulses can be longer than the time between them.

In this example, the timing uses a particular type of row driver circuit, one that addresses each row and generates the pulses that go to the pixel row control lines TXn, SEL and RESET using latches on each row signal. There are other ways this logic could be implemented; specifically, the same timings of the pixel control lines can be generated by other types of logic and the same concepts would apply.

Also, in these examples a four-way shared pixel cell is used, where the output portion of the four-way shared pixel cell is shared among the four pixels in a Bayer group. This is particularly useful for alternate frame timings, but the examples presented herein also could be applied to other pixel sharing arrangements.

The layout of the pixel array, the row drivers, the input lines to the row drivers, and the output lines of the row drivers of image sensor 821A are known, and so are not described in greater detail herein. A novel aspect is the sequence of the signals provided on then input lines to image sensor 821A by frame timer 825A that provide enhanced image sensor timing and as a consequence enhanced imaging capabilities.

FIG. 8A is representative of an image capture device that includes an image sensor coupled to a frame timer. The image sensor includes a plurality of rows of pixels and a visible light color filter array. The visible light color filter array includes a plurality of different visible light color filters, which are represented in FIG. 8A by a red, two greens, and a blue visible light color filters. The plurality of rows of pixels includes a plurality of pixel cells with each of the plurality of pixel cells including a plurality of pixels. In the example of FIG. 8A, the pixel cells are identified by locations (0,0), (0,1), (1,0), and (1,1). Each pixel of the plurality of pixels of a pixel cell is covered by a different one of the plurality of different visible light color filters. In the example of FIG. 8A, each of the plurality of pixels of the pixel cell at locations at location (0,0) is covered by one of the red, two greens, and a blue visible light color filters. The frame timer is coupled to the image sensor to provide image capture timing signals to the image sensor.

Figure 9A:
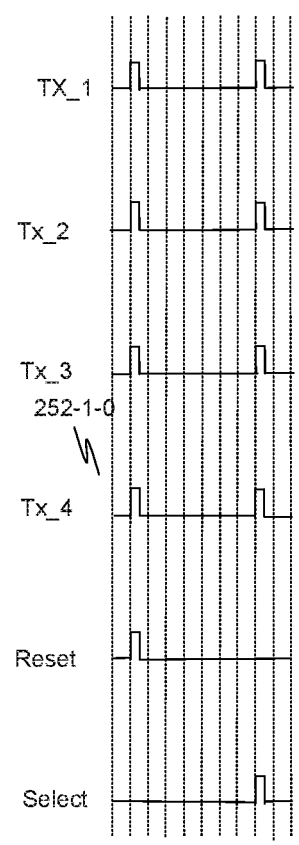
FIG. 9A is a timing diagram for multiple pixel binning at a location in the pixel array of FIG. 8A.

FIG. 9A illustrates a timing diagram for pixel binning of the four pixels at a location in a row of FIG. 8A as part of a rolling shutter. In this aspect, frame timer 825A simultaneously transmits an active signal on each of transmit set lines TX_SET<4,1> and an active signal on reset set line RST_SET. In response to these signals, the addressed row driver simultaneously drives an active transmit signal of each of first transmit line Tx_1, second transmit line Tx-2, third transmit line Tx_3, and fourth transmit line Tx_4 and an active reset signal on line RESET, as illustrated in FIG. 9A.

To read the pixels, after the appropriate exposure time, frame timer 825A simultaneously transmits an active signal on each of transmit set lines TX_SET<4,1> and an active signal on row select line ROW_SELECT. In response to these signals, the addressed row driver simultaneously drives an active transmit signal of each of first transmit line Tx_1, second transmit line Tx_2, third transmit line Tx_3, and fourth transmit line Tx_4 and an active signal on row select line SELECT, as illustrated in FIG. 9A.

Since all four of the pixels at a location are simultaneously connected to the shared column line, e.g., read out simultaneously, this integrates the four pixels in the analog stage, which improves the signal to noise level relative to doing the same integration during the digital processing stage. Combining the pixels like this makes a tradeoff; all color information is lost, as is some spatial resolution, in exchange for a reduction by 50% in the noise level.

If a single image sensor is being used as in FIG. 7, this pixel binning can be used to improve the signal to noise ratio of the captured scenes. If stereoscopic image sensors are being used, as in FIG. 3, one image sensor can be used to capture color scenes at the normal frame rate, and the other sensor can be used to capture scenes at a slower frame rate along with the pixel binning. The reset and select signals for the sensor with the lower frame rate, as shown for example in FIG. 5, are generated for each row as described with respect to FIG. 9A so that the lower frame rate and pixel binning are combined. Alternatively, if stereoscopic images sensors are being used, in one aspect, both image sensors capture frames at the same frame rate, e.g., the normal frame rate, but one of image sensors uses pixel binning. Hence, for each frame time interval, a full spatial resolution color frame is captured along with a monochromatic frame with a lower noise level. Both frames include the same scene and the spatial relationship between the two frames is known.

Multiple Pixel Binning with Visible Light Color Filter Array and an Alternative Light Filter Array In other aspects, interleaved arrays of visible-light color and alternative light (hyperspectral or other wavelength band) filters on CMOS image sensors with a four-way shared pixel cell and a novel frame timer are used.

Herein, an alternative light filter refers to a filter that filters other than visible light. The alternative light filter includes a plurality of individual alternative light filters, where each alternative light filter is configured to cover one or more image sensor pixels, and typically is configured to cover a plurality of image sensor pixels. Sometimes, an individual alternative light filter is referred to as a pixel of the alternative light filter. Similarly, a visible light color filter array includes a plurality of different individual visible light color filters.

Visible color filter arrays, e.g., Bayer color filter arrays, using organic dye are well-known, and can be applied to small (<2 μm) pixels. Other filter technologies, capable of selecting other wavelengths, narrow bands of wavelengths, or polarization of light are also well-known, but cannot currently be applied to small pixel structures found in typical image sensors because of the manufacturing processes required for those alternative filters cannot produce filter pixel sizes comparable to the pixel sizes of the image sensors. Typically, the pixel size of an alternative filter is a multiple of the pixel size of the image sensor.

Figure 9B:
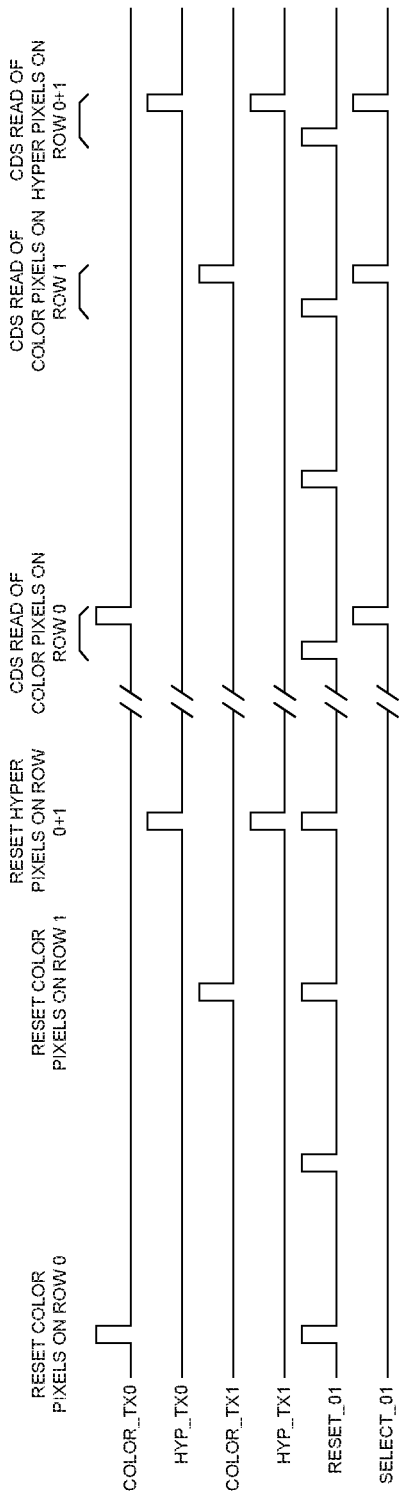
FIG. 9B is a timing diagram for the image capture device of FIG. 8B.

To overcome this problem for an image sensor used in an endoscope, a single image sensor is used to capture both conventional color images and images in other wavelength bands using a filter structure such as that illustrated in FIG. 9B. To compensate for the larger pixel size of the alternative light filter, single pixel red-green-blue (RGB) filters are interleaved with an array of individual alternative light filters, where, in this example, each individual alternative light filter covers a two-by-two pixel cell of the image sensor.

With the particular structure of an image sensor having four-way shared pixel cells, a matching arrangement of the filter array, and the use of specific timing sequences in the sensor's frame timer, noise benefits for the alternative filter signals can be obtained, without sacrifice to the noise or frame rate of the RGB pixels in the image sensor array. This operation makes use of the four-way shared pixel connections. As noted above with respect to FIG. 8A, the four-way shared pixel cell shares a single floating diffusion charge storage node among a group of four pixels.

The floating diffusion charge storage node SHARED, sometimes referred to as shared column driver SHARED, can be reset by pulsing reset line RESET, and can be buffered and connected to the column output line by pulsing select line SELECT. Floating diffusion charge storage node SHARED can also be connected to any or all of the four surrounding pixels by pulsing the corresponding transmit line or lines.

Figure 8B:
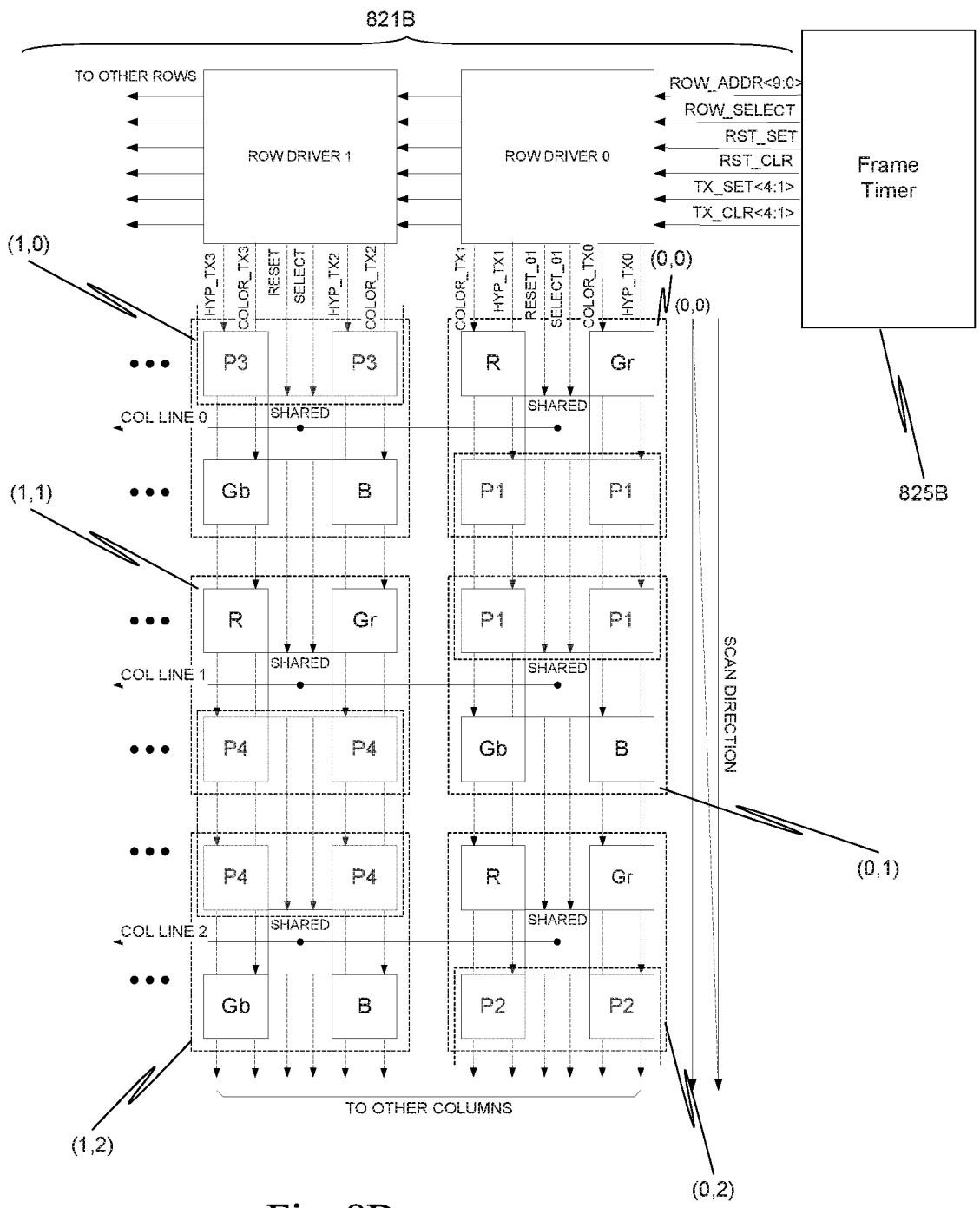
FIG. 8B is diagram of a frame timer and a portion of a pixel array of an image sensor with visible light color filter array and an alternative light filter array.

Since the four-way shared pixel cell has the flexibility to connect any of the four surrounding pixels to floating diffusion charge storage node SHARED (and hence, to the reset and/or the output), the connections can be made in the pixels on the transmit lines using pulses from frame timer 825B such that when each transmit line connected to one row of pixels is pulsed, the pixels in the row connected to floating diffusion charge storage node SHARED are connected in the pattern:

TX_1: 1 - - 1 1 - - 1 1 - - . . . . - - 1
TX_2: - 2 2 - - 2 2 - - 2 2 . . . 2 2 - where TX_1 refers to a transmit line to one of the rows in the plurality of four-way shared pixel cell and TX_2 refers to a transmit line to the other of the rows in the plurality of four-way shared pixel cell. Thus, as shown in FIG. 8B, the filters are then deposited in a staggered pattern, so that the four colors in the Bayer array are split between two different pixel-sharing cells. Because the two color pixels in each row are connected to different floating diffusion charge storage nodes SHARED, the two color pixels can be read at the same time using the appropriate timing sequence.

The splitting of the four colors in the Bayer array between two different pixel-sharing cells forces the alternative-filter pixels also to be split, but the charge in the two pixels connected to a column can be combined in floating diffusion charge storage node SHARED during readout without adding extra noise. The pairs of columns corresponding to a single filter location can be combined as voltages at the output of the column amplifiers (before the signal is digitized). The net result is a lower-noise readout of the alternative-filter pixels, without loss of spatial or temporal resolution of the other pixels in the array. Hence, in this example, the individual hyperspectral filters making up the hyperspectral filter array are staggered with respect to the individual portions of the color array filter, so that two rows' worth of charge on the hyperspectral pixels can be binned when one row is read, but the color pixels can be read separately and are not binned.

In addition to the charge-domain selective pixel binning described above, it is also possible to extend the exposure time selectively, by similar pulse sequences of transmit lines TX_x, which omit certain reset and read sequences for transmit lines TX_x that go to pixels with the individual alternative light filters.

Thus, FIG. 8B is an illustration of a representative portion of a Bayer color filter array and an alternative light filter array, e.g., a hyperspectral filter array, on a CMOS image sensor with four-way shared pixel cells and a novel frame timer 825B. Frame timer 825B, in this example, is configured to generate the pulse sequences illustrated in FIG. 9B.

FIG. 8B is an example of a portion of an image capture unit having an image sensor 821B with a Bayer color filter array and an alternative light filter array and a frame timer 825B. Image sensor 821B and frame timer 825B also are examples of image sensor 321L and frame timer 325L, image sensor 321R and frame timer 325R, or image sensor 321 and frame trimer 325.

Each location in image sensor 821B includes a plurality of pixels. In FIG. 8B, only six locations (0,0), (0,1), (0,2), (1,0), (1,1), (1,2), are shown, where each location includes four pixels connected to a shared column line, which is a four-way shared pixel cell. The other locations in image sensor 821B, which are not shown, are arranged in a corresponding manner.

In this example, some pixels in a four-way shared pixel cell are covered by a filter in the Bayer color filter array, while other pixels in the four-way shared pixel cell are covered by a filter in an alternative light filter array. As noted above, a pixel covered by a red filter R of the Bayer color filter array is referred to as a red pixel R. A pixel covered by a first green filter Gr of the Bayer color filter array, is referred to a first green pixel Gr. A pixel covered by a second green filter Gb of the Bayer color filter array, is referred to a second green pixel Gb. A pixel covered by a blue filter B of the Bayer color filter array is referred to as a blue pixel B.

Pixels in a group of pixels covered by an individual alternative light filter of the alternative light filter array are represented by a same reference numeral Pj, where j is an integer number, and are referred to as alternative light filtered pixels. As indicated above, in this example, each individual alternative light filter occupies a two-by-two pixel cell of image sensor 821B, but pixels Pj are split between adjacent four-way shared pixel cells. Thus, in image sensor 821B, each four-way shared pixel cell at locations (0,0), (0,1), (0,2), (1,0), (1,1), (1,2) includes a plurality of visible light color filtered pixels and a plurality of alternative light filtered pixels.

In particular, four-way shared pixel cell at location (0,0) includes a red pixel R, a first green pixel Gr, and two alternative light filtered pixel P1, P1. Four-way shared pixel cell at location (0,1) includes a blue pixel B, a second green pixel Gb, and two alternative light filtered pixel P1, P1. Thus, as described above, the four Bayer filtered pixels, red pixel R, first green pixel Gr, second green pixel Gb and blue pixel B are split between the two adjacent four-way shared pixel cells. Similarly, two of the pixels P1, P1 covered by a single alternative light filter array pixel are in each of the two adjacent four-way shared pixel cells.

Each row driver of image sensor 821B is connected to a plurality of pixel rows. A first color transmit line COLOR_Tx0 connects Row Driver 0 to each blue pixel B and to each first green pixel Gr in a first row—row 0—of image sensor 821B. A first alternative filter transmit line HYP_Tx0 connects Row Driver 0 to each alternative light filtered pixel in the first row. A second color transmit line COLOR_Tx1 connects Row Driver 0 to each red pixel R and to each second green pixel Gb in a second row—row 1—of image sensor 821B. A second alternative filter transmit line HYP_Tx1 connects Row Driver 0 to each alternative light filtered pixel in the second row.

A third color transmit line COLOR_Tx2 connects Row Driver 1 to each blue pixel B and to each first green pixel Gr in the third row—row 2—of image sensor 821B. A third alternative filter transmit line HYP_Tx2 connects Row Driver 1 to each alternative light filtered pixel in the third row. A fourth color transmit line COLOR_Tx3 connects Row Driver 1 to each red pixel R and to each second green pixel Gb in a fourth row—row 3—of image sensor 821B. A fourth alternative filter transmit line HYP_Tx3 connects Row Driver 1 to each alternative light filtered pixel in the fourth row. The line arrangement connecting Row Drivers 0 and 1 to the pixel rows is repeated down the column of image sensor 821B.

Thus, the transmit lines are connected to pixels in adjacent pixel rows with the patterns by frame time 825B providing appropriate pulses, as described above, i.e.:

COLOR_Tx0 1 - - 1 1 - - 1 1 - - . . . . - - 1
HYP_Tx0 - 2 2 - - 2 2 - - 2 2 . . . 2 2 -
COLOR_Tx1 1 - - 1 1 - - 1 1 - - . . . . - - 1
HYP_Tx1 - 2 2 - - 2 2 - - 2 2 . . . 2 2 -
COLOR_Tx2 - 2 2 - - 2 2 - - 2 2 . . . 2 2 -
HYP_Tx2 1 - - 1 1 - - 1 1 - - . . . . - - 1
COLOR_Tx3 - 2 2 - - 2 2 - - 2 2 . . . 2 2 -
HYP_Tx3 1 - - 1 1 - - 1 1 - - . . . . - - 1

A first reset line RESET_01 connects Row Driver 0 to a shared column driver SHARED at each location in the first and second pixel rows. A first select line SELECT_01 connects Row Driver 0 to shared column driver SHARED at each location in the first and second pixel rows. As explained above, in one aspect, each shared column driver SHARED is a single floating diffusion charge storage node.

A second reset line RESET connects Row Driver 1 to a shared column driver SHARED at each location in the third and fourth pixel rows. A second select line SELECT connects Row Driver 1 to shared column driver SHARED at each location in the third and fourth pixel rows.

Frame timer 825B is connected to each of the row drivers of image sensor 821A by a plurality of lines. In this example, the plurality of lines includes twenty-one lines.

Ten lines of the twenty-one lines are row address lines ROW_ADDR<9,0>. Row address lines ROW_ADDR<9,0> carry an address of the row being accessed by frame timer 825B.

Three of the twenty-one lines are a row select line ROW_SELECT, a reset set line RST_SET, and a reset clear line RST_CLR. An active signal on row select line ROW_SELECT causes the row driver addressed by the address on row address lines ROW_ADDR<9,0> to drive an active signal on the select line. An active signal on reset set line RST_SET causes the row driver addressed by the address on row address lines ROW_ADDR<9,0> to drive an active signal on the reset line.

An active signal on reset clear line RST_CLR causes the row driver addressed by the address on row address lines ROW_ADDR<9,0> to drive an inactive signal on the reset line.

Four of the twenty one lines are transmit set lines TX_SET<4,1> and another four of the twenty-one lines are transmit clear lines TX_CLR<4,1>. Each one of transmit set lines TX_SET<4,1> is coupled through the row driver to a different one of the first transmit line, the second transmit line, the third transmit line, and the fourth transmit line connected to the addressed row driver.

An active signal on transmit set line TX_SET(1) causes the row driver addressed by the address on row address lines ROW_ADDR<9,0> to drive an active signal on the first transmit line, and so on for the other transmit set lines. An active signal on transmit clear line TX_CLR(1) causes the row driver addressed by the address on row address lines ROW_ADDR<9,0> to drive an inactive signal on the first transmit line, and so on for the other transmit lines.

Thus, in image sensor 821B, the usual connections of the paired transmission lines to the pixels in each row, as illustrated in FIG. 8A, are permuted, so the pixels of like filter types (regular visible light color filter array or alternative light filter array), are connected to separate column drivers and readout circuits on each row. Because of this connection, separate timing control for the regular and alternative light filter arrays are obtained. FIG. 9B is a timing diagram that illustrates operations of image sensor 821B.

The example pulse sequence shown in FIG. 9B from frame timer 825B illustrates a reset of the pixels on pixel rows 0 and 1, followed later by a readout of those pixels. Pixel rows 0 and 1 are the rows connected to Row Driver 0. When the transmit pulse coincides with a reset pulse, both floating diffusion charge storage node SHARED and the photodiode(s) connected to floating diffusion charge storage node SHARED by active transmit pulses are reset. When a reset pulse occurs alone, the reset pulse resets only floating diffusion charge storage node SHARED, which is required for Correlated Double Sampling (CDS) to reduce readout noise.

The example pulse sequence in FIG. 9B:
1. Resets the color pixels on Row 0.
2. Resets the color pixels on Row 1.
3. Resets the alternative-filter pixels on Rows 0 and 1 together.
4. Later, reads the color pixels on Row 0.
5. Reads the color pixels on Row 1.
6. Reads the alternative-filter pixels on Rows 0 and 1, binned together.

Other exposures can be obtained by tuning the delay between reset and read sequences, and by selectively omitting reset/read sequences for some pixel types.

Thus, FIGS. 8B and 9B are illustrative of an image capture device including an image sensor coupled to a frame timer. The image sensor includes a plurality of rows of pixels, a visible light color filter array, and an alternative light filter array. The plurality of rows of pixels include a plurality of pixel cells. For example, the plurality of pixel cells at locations (0,0), (0,1), (0,2), (1,0), (1,1), and (1,2) in FIG. 8B. Each of the plurality of pixel cells including a plurality of pixels, which in the example of FIG. 8B is four pixels.

The visible light color filter array includes a plurality of different visible light color filters, which are represented in FIG. 8A by a red, two greens, and a blue visible light color filters. An alternative light filter array includes a plurality of individual alternative light filters. One individual alternative light filter of the plurality of individual alternative light filters covers both a first set of pixels of a plurality of pixels in a first pixel cell of the plurality of pixel cells and a second set of pixels of a plurality of pixels in a second pixel cell of the plurality of pixel cells. The first pixel cell is adjacent the second pixel cell. See the pixel cells at locations (0,0), (0,1) for an example of an individual alternative light filter. Each of the plurality of the different individual visible light color filters covers a different pixel in the first and second sets of pixels. The pixels covered by individual visible light color filters of the plurality of individual visible light color filters are different from pixels covered by the individual alternative light filter.

The frame timer is coupled to the image sensor to provide image capture timing signals to the image sensor. For example, frame timer is configured to simultaneously reset pixels in the first and second pixel cells covered by one of the plurality of different individual visible light color filters.

Figure 8C:
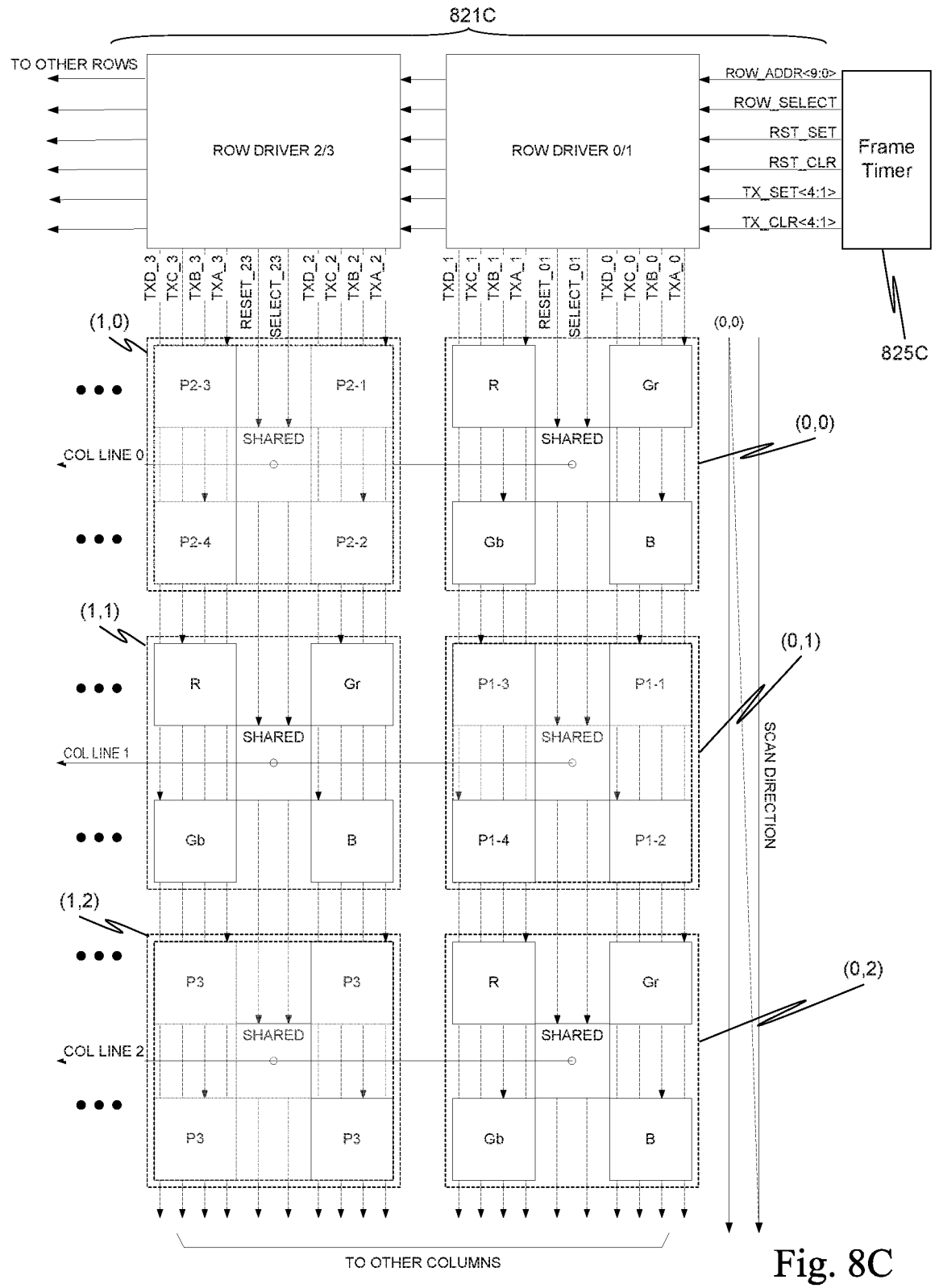
FIG. 8C is diagram of another example of a frame timer and a portion of a pixel array of an image sensor with a visible light color filter array and an alternative light filter array.

As indicated above, the binning of data and the use of a combination of a visible light color filter array and an alternative filter array also can be implemented in other ways using a shared pixel cell. For example, FIG. 8C is an illustration of a representative portion of a Bayer color filter array and an alternative light filter array, e.g., a hyperspectral filter array, on a CMOS image sensor with four-way shared pixel cells and a novel frame timer 825C. As noted previously, a Bayer color filter arrays is an example of a visible light color filter array, and the use of a Bayer color filter array is not intended to limit the visible light color filter array to the particular combination of color filters described. Also, FIG. 8C is an example of a portion of an image capture unit having an image sensor 821C with a Bayer color filter array and an alternative light filter array and a frame timer 825C. Image sensor 821C and frame timer 825C also are examples of image sensor 321L and frame timer 325L, image sensor 321R and frame timer 325R, or image sensor 321 and frame trimer 325.

Each location in image sensor 821C includes a plurality of pixels. In FIG. 8C, only six locations (0,0), (0,1), (0,2), (1,0), (1,1), (1,2) are shown, where each location includes four pixels connected to a shared column line, which is a four-way shared pixel cell. The other locations in image sensor 821C, which are not shown, are arranged in a corresponding manner.

In this example, in a pair of rows, alternating four-way shared pixel cells are covered by a portion of visible light color filter array, and alternating four-way shared pixel cells are covered by an individual alternative light filter of an alternative light filter array. As noted above, when the visible light color filter array is a Bayer color filter array, the pixels in a four-way shared pixel cell covered by a portion of the Bayer color filter array. Specifically, a pixel covered by a red filter R of the Bayer color filter array is referred to as a red pixel R. A pixel covered by a first green filter Gr of the Bayer color filter array, is referred to a first green pixel Gr. A pixel covered by a second green filter Gb of the Bayer color filter array, is referred to a second green pixel Gb. A pixel covered by a blue filter B of the Bayer color filter array is referred to as a blue pixel B. When all the pixels in a four-way shared pixel cell are covered by a portion of a visible light color filter array, the pixels are referred to as a visible light color filtered pixel cell.

Pixels in a four-way shared pixel cell covered by a portion of an individual alternative light filter cell of the alternative light filter array are represented by a same reference numeral Pj, where j is an integer number, and are referred to as an alternative light filtered pixel cell. As indicated above, in this example, each individual alternative light filter covers all the pixels in a four-way shared pixel cell of image sensor 821B. Thus, in this example locations (0,0), (1,1), (0,2) have visible light color filtered pixel cells, while locations, (0,1), (1,0) and (1,2) have alternative light filtered pixel cells.

Each row driver of image sensor 821C is connected to a plurality of pixel rows. In the prior examples, each row driver had two transmit lines connected to a row of pixels. In this example, each row driver has four transmit lines connected to a row of pixels. Hence, in this example, Row Driver 0 and Row Driver 1 from the earlier examples are combined into a single Row Driver 0/1, etc.

A first transmit line TXA_0 connects Row Driver 0/1 to each first green pixel Gr in a first row—row 0—of image sensor 821C, e.g., to every fourth pixel in the first row starting with the first pixel. A second transmit line TXB_0 connects Row Driver 0/1 to each blue pixel B in the first row of image sensor 821C, e.g., every fourth pixel in the first row starting with the second pixel. A third transmit line TXC_0 connects Row Driver 0/1 to each first alternative light filtered pixel Px-1 (where x equals 1 to 3 in FIG. 8C) of each alternative light filtered pixel cell in the first row of image sensor 821C, e.g., to every fourth pixel in the first row starting with the third pixel. A fourth transmit line TXD_0 connects Row Driver 0/1 to each second alternative light filtered pixel Px-2 of each alternative light filtered pixel cell in the first row of image sensor 821C, e.g., every fourth pixel in the first row starting with the fourth pixel.

A fifth transmit line TXA_1 connects Row Driver 0/1 to each red pixel R in a second row—row 1—of image sensor 821C, e.g., every fourth pixel in the second row starting with the first pixel. A sixth transmit line TXB_1 connects Row Driver 0/1 to each second green pixel Gb in the second row of image sensor 821C, e.g., every fourth pixel in the second row starting with the second pixel. A seventh transmit line TXC_1 connects Row Driver 0/1 to each third alternative light filtered pixel Px-3 (where x equals 1 to 3 in FIG. 8C) of each alternative light filtered pixel cell in the second row of image sensor 821C, e.g., to every fourth pixel in the second row starting with the third pixel. An eighth transmit line TXD_1 connects Row Driver 0/1 to each fourth alternative light filtered pixel Px-4 of each alternative light filtered pixel cell in the second row of image sensor 821C, e.g., to every fourth pixel in the second row starting with the fourth pixel.

A first reset line RESET_01 connects Row Driver 0/1 to a shared column driver SHARED at each location in the first and second pixel rows. A first select line SELECT_01 connects Row Driver 0/1 to shared column driver SHARED at each location in the first and second pixel rows. As explained above, in one aspect, each shared column driver SHARED is a single floating diffusion charge storage node.

With respect to Row Driver 2/3, a first transmit line TXA_2 connects Row Driver 2/3 to each first alternative light filtered pixel Px-1 (where x equals 1 to 3 in FIG. 8C) in a third row—row 2—of image sensor 821C, e.g., to every fourth pixel in the third row staring with the first pixel. A second transmit line TXB_2 connects Row Driver 2/3 to each second alternative light filtered pixel Px-2 of each alternative light filtered pixel cell in the third row of image sensor 821C, e.g., to every fourth pixel in the third row staring with the second pixel. A third transmit line TXC_2 connects Row Driver 2/3 to each first green pixel Gr of each visible light color filtered pixel cell in the third row of image sensor 821C, e.g., to every fourth pixel in the third row staring with the third pixel. A fourth transmit line TXD_2 connects Row Driver 2/3 to each blue pixel B of each visible light color filtered pixel cell in the third row of image sensor 821C, e.g., to every fourth pixel in the third row staring with the fourth pixel.

Continuing with respect to Row Driver 2/3, a fifth transmit line TXA_3 connects Row Driver 2/3 to each third alternative light filtered pixel Px-3 (where x equals 1 to 3 in FIG. 8C) in a fourth row—row 3—of image sensor 821C, e.g., to every fourth pixel in the fourth row staring with the first pixel. A sixth transmit line TXB_3 connects Row Driver 2/3 to each fourth alternative light filtered pixel Px-4 of each alternative light filtered pixel cell in the fourth row of image sensor 821C, e.g., to every fourth pixel in the fourth row staring with the second pixel. A seventh transmit line TXC_3 connects Row Driver 2/3 to each red pixel R of each visible light color filtered pixel cell in the fourth row of image sensor 821C, e.g., to every fourth pixel in the fourth row staring with the third pixel. An eighth transmit line TXD_3 connects Row Driver 2/3 to each second green pixel Gb of each visible light color filtered pixel cell in the fourth row of image sensor 821C, e.g., to every fourth pixel in the fourth row staring with the fourth pixel.

A second reset line RESET 23 connects Row Driver 2/3 to a shared column driver SHARED at each location in the third and fourth pixel rows. A second select line SELECT 23 connects Row Driver 2/3 to shared column driver at each location in the third and fourth pixel rows. The configuration of Row Drivers 0/1 and 2/3 is repeated down the column, and so additional row drivers are not illustrated in FIG. 8C.

Frame timer 825C is connected to each of the row drivers of image sensor 821A by a plurality of lines. In this example, the plurality of lines includes twenty-one lines.

Ten lines of the twenty-one lines are row address lines ROW_ADDR<9,0>. Row address lines ROW_ADDR<9,0> carry an address of the row being accessed by frame timer 825C.

Three of the twenty-one lines are a row select line ROW_SELECT, a reset set line RST_SET, and a reset clear line RST_CLR. An active signal on row select line ROW_SELECT causes the row driver addressed by the address on row address lines ROW_ADDR<9,0> to drive an active signal on the select line. An active signal on reset set line RST_SET causes the row driver addressed by the address on row address lines ROW_ADDR<9,0> to drive an active signal on the reset line.

An active signal on reset clear line RST_CLR causes the row driver addressed by the address on row address lines ROW_ADDR<9,0> to drive an inactive signal on the reset line.

Four of the twenty one lines are transmit set lines TX_SET<4,1> and another four of the twenty-one lines are transmit clear lines TX_CLR<4,1>. Each one of transmit set lines TX_SET<4,1> is coupled through the row driver to a different one of the first transmit line, the second transmit line, the third transmit line, and the fourth transmit line connected to the addressed row driver.

An active signal on transmit set line TX_SET(1) causes the row driver addressed by the address on row address lines ROW_ADDR<9,0> to drive an active signal on the first transmit line, and so on for the other transmit set lines. An active signal on transmit clear line TX_CLR(1) causes the row driver addressed by the address on row address lines ROW_ADDR<9,0> to drive an inactive signal on the first transmit line, and so on for the other transmit lines.

In image sensor 821C, four transmission gate phases are needed to bin the alternative light filtered pixels two by two in the charge domain (which provides four time the signal without added noise) and to sample all visible light color filtered pixels at full resolution (unbinned). As shown in FIG. 8C, to accomplish this, it is necessary to run duplicate row lines for each transmission gate through the pixel array. To assist in differentiating between the duplicate row lines, the lines are labeled as TXA_<row #>, and TXB_<row #> in FIG. 8C. Phase A (indicated by labels TXA_<row #>), as described above, goes to goes to every fourth pixel in a row starting with the first pixel, while phase B (indicated by labels TXB_<row #>) goes to every fourth pixel in the row starting with the second one, and so on. In the four-way shared pixel cell of FIG. 8A, there are only two phases, and the row lines for each phase connect to alternate pixels.

Figure 9C:
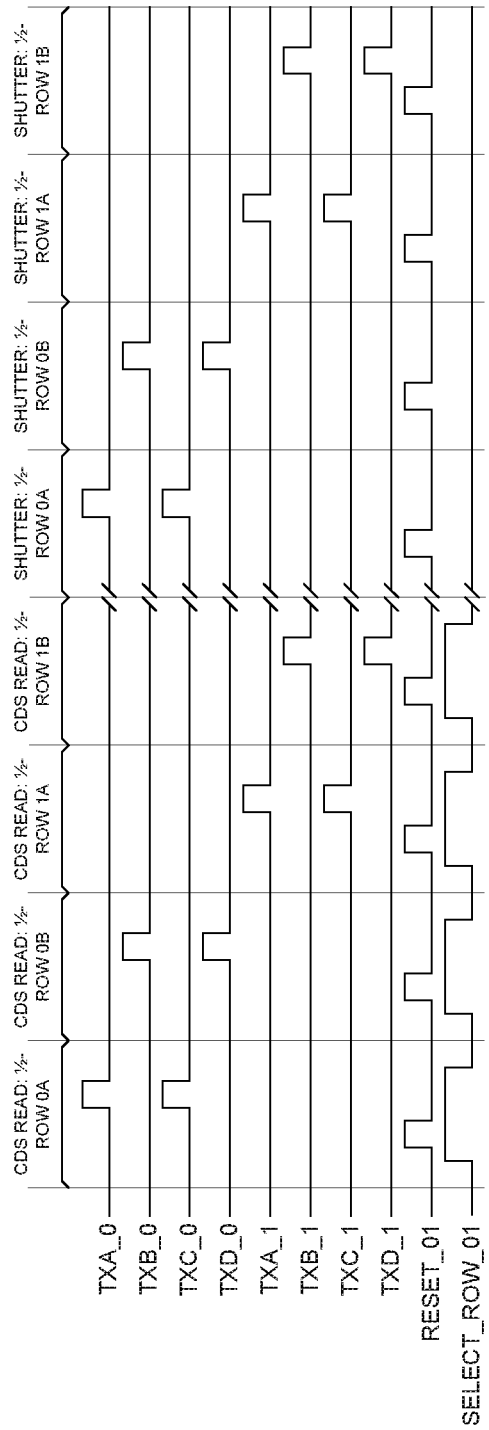
FIG. 9C is a timing diagram for an unbinned pixel read and reset sequence of rows zero and one of the image capture device of FIG. 8C.
Figure 9D:
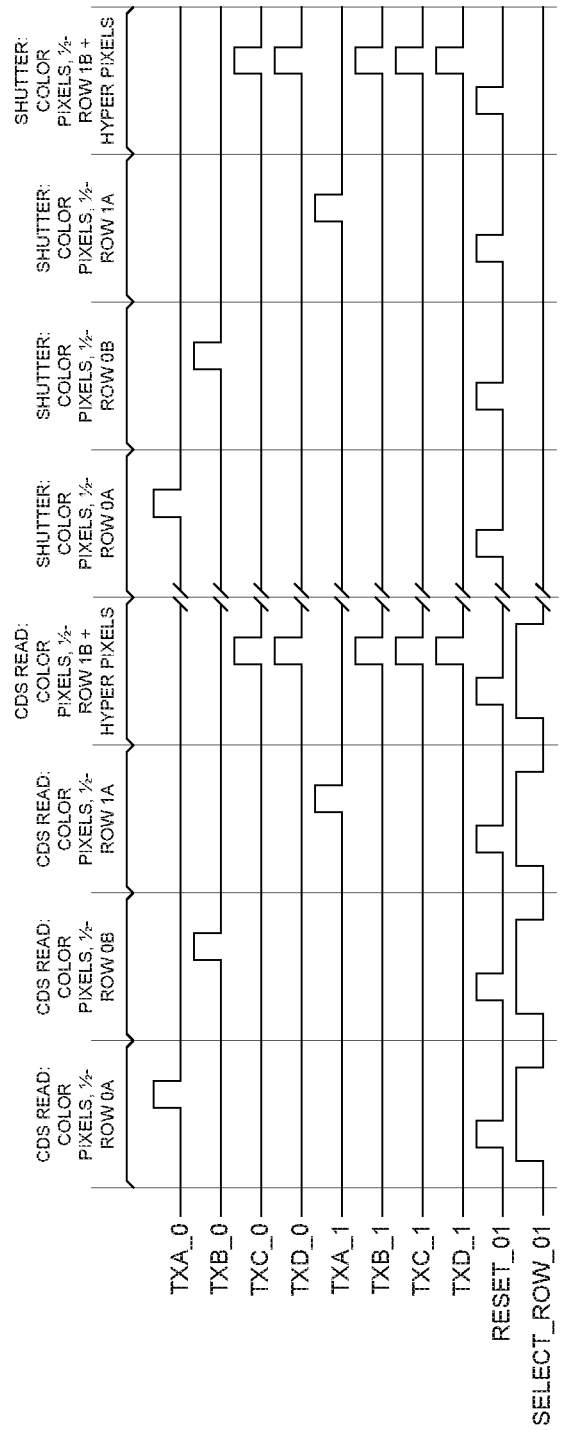
FIG. 9D is a timing diagram for a four-way binned hyperspectral pixel read and reset sequence of rows zero and one of the image capture device of FIG. 8C.
Figure 9E:
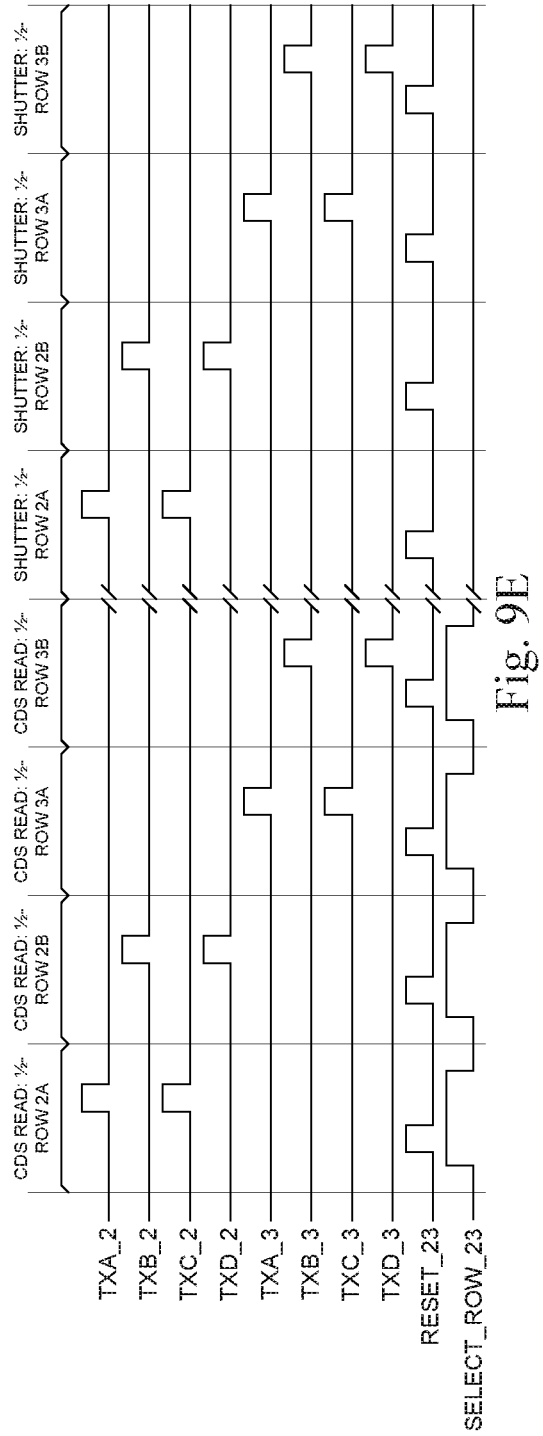
FIG. 9E is a timing diagram for an unbinned pixel read and reset sequence of rows two and three of the image capture device of FIG. 8C.
Figure 9F:
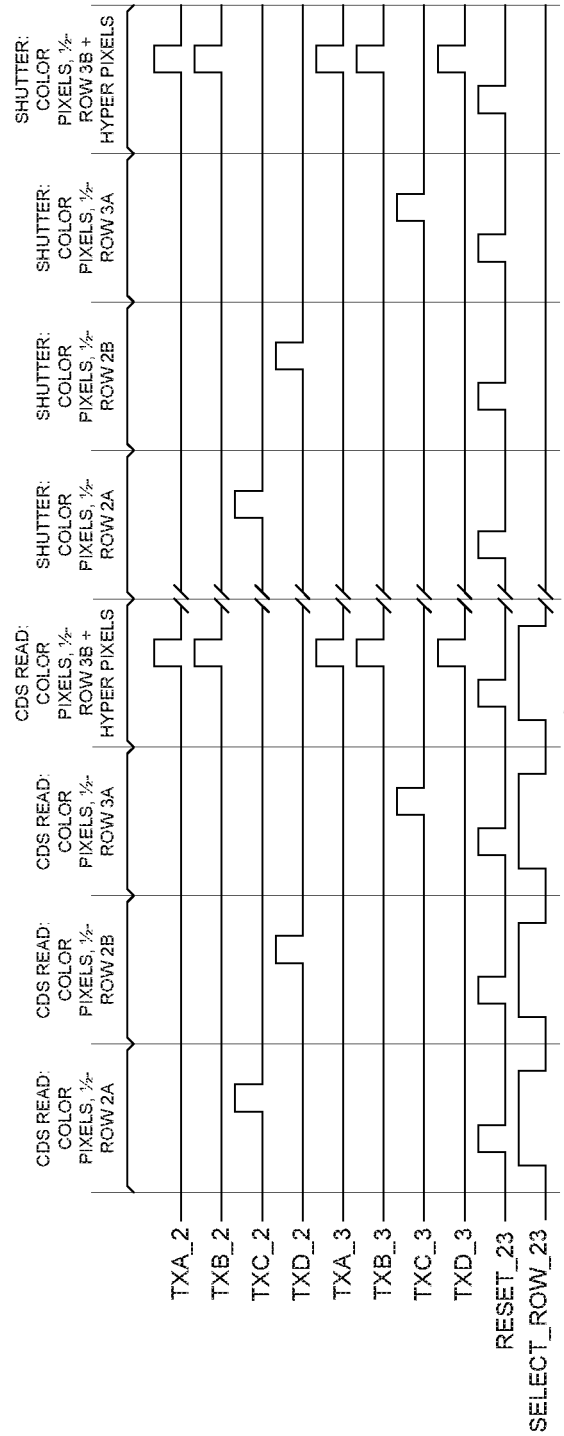
FIG. 9F is a timing diagram for a four-way binned hyperspectral pixel read and reset sequence of rows two and three of the image capture device of FIG. 8C.

When the alternative light filtered pixel cells are interleaved among the visible light color filtered cells diagonally, as illustrated in FIG. 8C, instead of being arranged as a two column set of color pixels, a two column set of hyperspectral pixels, a two column set of color pixels, etc., as illustrated in FIG. 8B, the pulse sequences for the binned case are different on the odd row pairs than on the even row pairs. Thus, in FIGS. 9C to 9F different timing diagrams are presented, one for the unbinned case (FIGS. 9C and 9E) and one for the case where the color information is full-resolution but the hyperspectral is binned two by two (FIGS. 9D and 9F). FIGS. 9C and 9D show the timing sequences for the even row pairs (0/1, 4/5, 8/9, . . . ) and FIGS. 9E and 9F show the timing sequences for the odd row pairs, (2/3, 6/7, 10/11, . . . ). The pulse timings for the unbinned case (FIGS. 9C and 9E) are the same for the even row pairs and the odd row pairs, but for the binned case (FIGS. 9D and 9F), the pulse timings are different for the even row pairs and the odd row pairs.

In the binned case, all four alternative light filtered pixels in a four-way shared cell are connected simultaneously to the shared column line, and the color pixels are read out in full resolution based on the timing diagrams of FIGS. 9D and 9F. In the unbinned cases, each pixel is read individually.

FIGS. 10 and 11 illustrate some of the combinations that can be obtained using the stereoscopic image capture device of FIG. 3 with dual frame timer logic circuits and the various timing sequences described above. As noted above, the stereoscopic image capture device includes two image sensors that each capture a frame and each frame includes a scene.

First, a normal stereoscopic scene 1001 is obtained when each of the frame timers implements a rolling shutter with the same exposure time per image sensor row. Alternatively, the left and right scenes 1002 can have different exposure times. In this aspect, as illustrated in FIG. 6, one frame timer implements a rolling shutter with a first exposure time, and the other frame timer implements a rolling shutter with a second different exposure time.

With multiple pixel binning, one of the two scenes produced is a monochromatic scene 1003. One frame timer for an image sensor with a Bayer color filter array uses a rolling shutter and outputs a single pixel for each location in a row of the image sensor. Each location is a row includes a plurality of Bayer pixels. See, for example, FIGS. 8A and 9A.

Different exposure times and multiple pixel binning can be combined to produce scenes with different exposure times and one of the scenes is a monochromatic scene 1104.

In the examples of FIG. 10, a stereoscopic image capture device was used. However, as illustrated in FIG. 11, various combinations of the frame timer timing sequences described above can also be implemented using the image capture device of FIG. 7, which has a single frame timer logic circuit and a single image sensor. First, a normal scene 1101 is obtained when the frame timer implements a rolling shutter with the same exposure time per image sensor row.

With multiple pixel binning, the scene produced is a monochromatic scene 1102. The frame timer for an image sensor with a Bayer color filter array uses a rolling shutter and outputs a single pixel for each location in a row of the image sensor. Each location is a row includes a plurality of Bayer pixels. See, for example, FIGS. 8A and 9A.

Herein, a computer program product includes a medium configured to store computer readable code needed for any one or any combination of methods described herein or in which computer readable code for any one or any combination of the methods is stored. Some examples of computer program products are CD-ROM discs, DVD discs, flash memory, ROM cards, floppy discs, magnetic tapes, computer hard drives, servers on a network and signals transmitted over a network representing computer readable program code. A tangible non-transitory computer program product comprises a medium configured to store computer readable instructions for any one of, or any combination of the methods described herein or in which computer readable instructions for any one of, or any combination of the methods is stored. Tangible non-transitory computer program products are CD-ROM discs, DVD discs, flash memory, ROM cards, floppy discs, magnetic tapes, computer hard drives and other physical storage mediums.

In view of this disclosure, instructions used in any one of, or any combination of methods described herein can be implemented in a wide variety of computer system configurations using an operating system and computer programming language of interest to the user.

As used herein, "first," "second," "third," etc. are adjectives used to distinguish between different components or elements. Thus, "first," "second," and "third" are not intended to imply any ordering of the components or elements or to imply any total number of components or elements.

The above description and the accompanying drawings that illustrate aspects and embodiments of the present inventions should not be taken as limiting—the claims define the protected inventions. Various mechanical, compositional, structural, electrical, and operational changes may be made without departing from the spirit and scope of this description and the claims. In some instances, well-known circuits, structures, and techniques have not been shown or described in detail to avoid obscuring the invention.

Further, this description's terminology is not intended to limit the invention. For example, spatially relative terms—such as "beneath", "below", "lower", "above", "upper", "proximal", "distal", and the like—may be used to describe one element's or feature's relationship to another element or feature as illustrated in the figures. These spatially relative terms are intended to encompass different positions (i.e., locations) and orientations (i.e., rotational placements) of the device in use or operation in addition to the position and orientation shown in the figures. For example, if the device in the figures were turned over, elements described as "below" or "beneath" other elements or features would then be "above" or "over" the other elements or features. Thus, the exemplary term "below" can encompass both positions and orientations of above and below. The device may be otherwise oriented (rotated 90 degrees or at other orientations) and the spatially relative descriptors used herein interpreted accordingly. Likewise, descriptions of movement along and around various axes include various special device positions and orientations.

The singular forms "a", "an", and "the" are intended to include the plural forms as well, unless the context indicates otherwise. The terms "comprises", "comprising", "includes", and the like specify the presence of stated features, steps, operations, elements, and/or components but do not preclude the presence or addition of one or more other features, steps, operations, elements, components, and/or groups. Components described as coupled may be electrically or mechanically directly coupled, or they may be indirectly coupled via one or more intermediate components.

All examples and illustrative references are non-limiting and should not be used to limit the claims to specific implementations and embodiments described herein and their equivalents. Any headings are solely for formatting and should not be used to limit the subject matter in any way, because text under one heading may cross reference or apply to text under one or more headings. Finally, in view of this disclosure, particular features described in relation to one aspect or embodiment may be applied to other disclosed.

We claim:

1. An image capture device comprising:
an image sensor comprising a first pixel cell and a second pixel cell adjacent to the first pixel cell;
a plurality of individual alternative light filters configured to filter non-visible light, one individual alternative light filter of the plurality of individual alternative light filters covering both a first set of pixels of the first pixel cell and a second set of pixels of the second pixel cell; and a plurality of individual visible light color filters covering pixels of the first and second pixel cells, the pixels of the first and second pixel cells covered by the individual visible light color filters being different from the first and second sets of pixels covered by the individual alternative light filters.

2. The image capture device of claim 1, wherein:
the first pixel cell comprises a first pixel, a second pixel, a third pixel, and a fourth pixel arranged in a first two-by-two array of pixels, the third and fourth pixels of the first pixel cell being on a bottom row of the first two-by-two array of pixels;
the second pixel cell comprises a first pixel, a second pixel, a third pixel, and a fourth pixel arranged in a second two-by-two array of pixels, the first and second pixels of the second pixel cell being on a top row of the second two-by-two array of pixels;
the first and second sets of pixels covered by the one individual alternative light filter includes only the third and fourth pixels of the first pixel cell and the first and second pixels of the second pixel cell; and
the pixels covered by the individual visible light color filters include only the first and second pixels of the first pixel cell and the third and fourth pixels of the second pixel cell.

3. The image capture device of claim 2, wherein the individual visible light color filters comprise:
a red color filter covering the first pixel of the first pixel cell;
a first green color filter covering the second pixel of the first pixel cell;
a second green color filter covering the third pixel of the second pixel cell; and
a blue color filter covering the fourth pixel of the second pixel cell.

4. The image capture device of claim 1, further comprising:
a first frame timer coupled to the image sensor to provide image capture timing signals to the image sensor to cause the image sensor to capture a first plurality of frames of pixel data at a first frame rate;
an additional image sensor; and
a second frame timer coupled to the additional image sensor to provide additional image capture timing signals to the additional image sensor to cause the additional image sensor to capture a second plurality of frames of pixel data at a second frame rate different than the first frame rate.

5. The image capture device of claim 4:
the image capture timing signals provided by the first frame timer are configured to cause the image sensor to capture N frames of pixel data, where N is greater than one; and
the image capture timing signals provided by the second frame timer are configured to cause the additional image sensor to capture only a single frame of pixel data while the image sensor captures the N frames.

6. The image capture device of claim 4:
the first frame timer being configured to expose pixels of the image sensor for a first exposure time;
the second frame timer being configured to expose pixels of the additional image sensor for a second exposure time; and
the first exposure time being different from the second exposure time.

7. The image capture device of claim 4, the first frame timer being configured to simultaneously reset pixels in the first and second pixel cells covered by one of the plurality of individual visible light color filters.

8. The image capture device of claim 4:
the first frame timer being configured to simultaneously read a first pixel in the first set of pixels and a second pixel of the second set of pixels.

9. The image capture device of claim 8, wherein the image capture device is configured to bin the first pixel read by the first frame timer and the second pixel read by the first frame timer.

10. The image capture device of claim 1:
the image sensor further comprising a plurality of visible light color filtered pixel cells interleaved with a plurality of alternative light filtered pixel cells.

11. The image capture device of claim 1, wherein the image sensor comprises a Bayer color filter array.

12. A method comprising:
providing an image sensor comprising a first pixel cell and a second pixel cell adjacent to the first pixel cell;
causing a plurality of individual alternative light filters to filter non-visible light, one individual alternative light filter of the plurality of individual alternative light filters covering both a first set of pixels of the first pixel cell and a second set of pixels of the second pixel cell; and
causing a plurality of individual visible light color filters to filter visible light, the plurality of individual visible light color filters covering pixels of the first and second pixel cells, the pixels of the first and second pixel cells covered by the individual visible light color filters being different from the first and second sets of pixels covered by the individual alternative light filters.

13. The method of claim 12, wherein:
the first pixel cell comprises a first pixel, a second pixel, a third pixel, and a fourth pixel arranged in a first two-by-two array of pixels, the third and fourth pixels of the first pixel cell being on a bottom row of the first two-by-two array of pixels;
the second pixel cell comprises a first pixel, a second pixel, a third pixel, and a fourth pixel arranged in a second two-by-two array of pixels, the first and second pixels of the second pixel cell being on a top row of the second two-by-two array of pixels;
the first and second sets of pixels covered by the one individual alternative light filter includes only the third and fourth pixels of the first pixel cell and the first and second pixels of the second pixel cell; and
the pixels covered by the individual visible light color filters include only the first and second pixels of the first pixel cell and the third and fourth pixels of the second pixel cell.

14. The method of claim 13, wherein the individual visible light color filters comprise:
a red color filter covering the first pixel of the first pixel cell;
a first green color filter covering the second pixel of the first pixel cell;
a second green color filter covering the third pixel of the second pixel cell; and
a blue color filter covering the fourth pixel of the second pixel cell.

15. The method of claim 12, further comprising:
causing a first frame timer coupled to the image sensor to provide image capture timing signals to the image sensor to cause the image sensor to capture a first plurality of frames of pixel data at a first frame rate; and causing a second frame timer coupled to an additional image sensor to provide additional image capture timing signals to the additional image sensor to cause the additional image sensor to capture a second plurality of frames of pixel data at a second frame rate different than the first frame rate.

16. The method of claim 15, wherein:

the image capture timing signals provided by the first frame timer are configured to cause the image sensor to capture N frames of pixel data, where N is greater than one; and the image capture timing signals provided by the second frame timer are configured to cause the additional image sensor to capture only a single frame of pixel data while the image sensor captures the N frames.

17. The method of claim 15, further comprising:

causing the first frame timer to expose pixels of the image sensor for a first exposure time;

causing the second frame timer to expose pixels of the additional image sensor for a second exposure time;

the first exposure time being different from the second exposure time.

18. The method of claim 15, further comprising causing the first frame timer to simultaneously reset pixels in the first and second pixel cells covered by one of the plurality of individual visible light color filters.

19. The method of claim 15, further comprising causing the first frame timer to simultaneously read a first pixel of the first pixel cell covered by one of the plurality of individual visible light color filters and a second pixel of the second pixel cell covered by one of the plurality of individual visible light color filters.

* * * * *